(12) United States Patent
Ono et al.

(10) Patent No.: US 12,149,661 B2
(45) Date of Patent: Nov. 19, 2024

(54) DOCUMENT FEEDING, IMAGE READING, AND IMAGE FORMING APPARATUS INCLUDING SLIDABLE DOCUMENT SUPPORTING TRAY THAT PIVOTS UP FROM A SECOND POSITION AND MOVES OBLIQUELY DOWNWARD

(71) Applicant: CANON KABUSHIKI KAISHA, Tokyo (JP)

(72) Inventors: Takahiro Ono, Ibaraki (JP); Takayuki Fukushima, Ibaraki (JP); Kazuki Matsuo, Kanagawa (JP); Yuya Yasuda, Tokyo (JP); Takuma Tachibana, Kanagawa (JP); Akiyuki Mitamura, Ibaraki (JP); Akira Matsumoto, Ibaraki (JP); Akira Urita, Ibaraki (JP); Norikazu Hishinuma, Chiba (JP); Takatsugu Nakamura, Saitama (JP); Yu Hashimoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/500,277

(22) Filed: Nov. 2, 2023

(65) Prior Publication Data

US 2024/0064247 A1 Feb. 22, 2024

Related U.S. Application Data

(63) Continuation of application No. 18/303,797, filed on Apr. 20, 2023, now Pat. No. 11,843,741.

(30) Foreign Application Priority Data

May 13, 2022 (JP) .................................. 2022-079422

(51) Int. Cl.
*H04N 1/00* (2006.01)
(52) U.S. Cl.
CPC ...... *H04N 1/00631* (2013.01); *H04N 1/00525* (2013.01); *H04N 1/0053* (2013.01); *H04N 1/00533* (2013.01); *H04N 1/00615* (2013.01)
(58) Field of Classification Search
CPC ............ H04N 1/00525; H04N 1/0053; H04N 1/00533; H04N 1/00615; H04N 1/00631;
(Continued)

(56) References Cited

U.S. PATENT DOCUMENTS 9,010,749 B2 4/2015 Mizuno et al.
9,247,086 B2 * 1/2016 Fujiwara ............ H04N 1/00615
(Continued)

FOREIGN PATENT DOCUMENTS

CN 209767636 U 12/2019
EP 2466867 B1 * 7/2018 ......... H04N 1/00525
(Continued)

OTHER PUBLICATIONS

Office Action issued in U.S. Appl. No. 18/303,713, mailed Dec. 26, 2023.
(Continued)

*Primary Examiner* — Scott A Rogers
(74) *Attorney, Agent, or Firm* — ROSSI, KIMMS & McDOWELL LLP

(57) ABSTRACT

A document supporting portion includes a first supporting portion and a second supporting portion. The first supporting portion has a first supporting surface that supports a document. The second supporting portion has a second supporting surface that supports the document together with the first supporting surface and provided so as to be slidable between a first position at which the second supporting portion located above the first supporting portion and a second
(Continued)

position at which the second supporting surface supports the document together with the first supporting surface. In a state where the second supporting portion is located at the first position, the second supporting surface constitutes a portion of an upper surface of the document feeding apparatus.

13 Claims, 29 Drawing Sheets

(58) Field of Classification Search
CPC .......... H04N 1/00535; H04N 1/00559; H04N 1/00588; H04N 1/00591; H04N 1/00599; H04N 1/00604
See application file for complete search history.

(56) References Cited

U.S. PATENT DOCUMENTS

| | | |
|---|---|---|
| 9,332,144 B2 | 5/2016 | Kozaki et al. |
| 9,363,396 B2 | 6/2016 | Sakakibara et al. |
| 10,686,955 B2 | 6/2020 | Yamada et al. |
| 11,413,888 B2 | 8/2022 | Takabayashi |
| 2006/0140693 A1 | 6/2006 | Takami |
| 2007/0223060 A1 | 9/2007 | Ikeno et al. |
| 2013/0056924 A1 | 3/2013 | Mizuno et al. |
| 2015/0092254 A1 | 4/2015 | Sakakibara et al. |
| 2016/0057300 A1 | 2/2016 | Ishizuka et al. |
| 2017/0251117 A1 | 8/2017 | Shirota et al. |
| 2018/0367686 A1 | 12/2018 | Yamada |
| 2021/0218856 A1 | 7/2021 | Okawa et al. |
| 2021/0234980 A1 | 7/2021 | Nishiyama |
| 2022/0263960 A1 | 8/2022 | Nakashima et al. |
| 2022/0337717 A1 | 10/2022 | Fujisaki |
| 2023/0370558 A1* | 11/2023 | Ono .................. H04N 1/1225 |
| 2024/0064248 A1* | 2/2024 | Ono .................. H04N 1/00493 |

FOREIGN PATENT DOCUMENTS

| | | |
|---|---|---|
| JP | H08328334 A | 12/1996 |
| JP | H1031337 A | 2/1998 |
| JP | 2001063175 A | 3/2001 |
| JP | 2004170658 A | 6/2004 |
| JP | 2006184701 A | 7/2006 |
| JP | 2014192800 A | 10/2014 |
| JP | 2015113198 A | 6/2015 |
| JP | 2016046681 A | 4/2016 |

OTHER PUBLICATIONS

Ono et al. Copending U.S. Appl. No. 18/303,713, filed Apr. 20, 2023 (a copy is not included because the cited application is not yet available to the public and the Examiner has ready access to the cited application).

Extended European search report issued in European Appln. No. 23172217.4, mailed on Sep. 14, 2023.

Extended European Search Report issued in European Appln. No. 23172219.0, mailed Sep. 27, 2023.

Notice of Allowance issued in U.S. Appl. No. 18/303,797, mailed Oct. 5, 2023.

Office Action issued in U.S. Appl. No. 18/303,713, mailed Apr. 26, 2024.

* cited by examiner

REAR SIDE ←——→ FRONT SIDE

FRONT SIDE ←→ REAR SIDE

FRONT SIDE ←→ REAR SIDE

REAR SIDE ←——→ FRONT SIDE

FRONT SIDE ↔ REAR SIDE

FRONT SIDE ↔ REAR SIDE

DOCUMENT FEEDING, IMAGE READING, AND IMAGE FORMING APPARATUS INCLUDING SLIDABLE DOCUMENT SUPPORTING TRAY THAT PIVOTS UP FROM A SECOND POSITION AND MOVES OBLIQUELY DOWNWARD

BACKGROUND OF THE INVENTION

Field of the Invention

The present invention relates to a document feeding apparatus that feeds a document, an image reading apparatus that reads an image on a document, and an image forming apparatus including such an image reading apparatus.

Description of the Related Art

As an image reading apparatus, an apparatus including an automatic document feeding apparatus (ADF) that automatically conveys a document to an image reading unit that reads an image on the document has been conventionally known. In the conventional ADF, a configuration is known in which a document tray on which a document to be fed to an image reading unit is mounted is pivotable between a closed position where a document placing surface faces downward and an open position where the document placing surface faces upward (for example, US2016/0057300 A1).

In a case where the image reading apparatus is installed in a narrow space such as under a shelf or a desk, there is a possibility that a sufficient space for opening and closing the document tray cannot be secured in the configuration of opening and closing the document tray as described above. That is, in a case where the image reading apparatus is installed in a narrow space, operability is not good.

SUMMARY OF THE INVENTION

The present invention provides a configuration having good operability even when an apparatus is installed in a narrow space.

According to a first aspect of the present invention, a document feeding apparatus includes a document supporting portion including a first supporting portion having a first supporting surface configured to support a document, and a second supporting portion having a second supporting surface configured to support the document together with the first supporting surface and provided so as to be slidable between a first position at which the second supporting portion located above the first supporting portion and a second position at which the second supporting surface supports the document together with the first supporting surface, and, a document feeding portion configured to feed the document supported by the document supporting portion. In a state where the second supporting portion is located at the first position, the second supporting surface constitutes a portion of an upper surface of the document feeding apparatus.

According to a second aspect of the present invention, an image reading apparatus includes a document supporting portion including a first supporting portion having a first supporting surface configured to support a document, and a second supporting portion having a second supporting surface configured to support the document together with the first supporting surface and provided so as to be slidable between a first position at which the second supporting portion located above the first supporting portion and a second position at which the second supporting surface supports the document together with the first supporting surface, a document feeding portion configured to feed a document supported by the document supporting portion, and, an image reading unit configured to read an image on a document fed by the document feeding portion. In a state where the second supporting portion is located at the first position, the second supporting surface constitutes a portion of an upper surface of the image reading apparatus.

According to a third aspect of the present invention, an image forming apparatus includes a document supporting portion including a first supporting portion having a first supporting surface configured to support a document, and a second supporting portion having a second supporting surface configured to support the document together with the first supporting surface and provided so as to be slidable between a first position at which the second supporting portion located above the first supporting portion and a second position at which the second supporting surface supports the document together with the first supporting surface, a document feeding portion configured to feed a document supported by the document supporting portion, an image reading unit configured to read an image on a document fed by the document feeding portion, and, an image forming unit configured to form an image on a sheet based on the image on the document read by the image reading unit. In a state where the second supporting portion is located at the first position, the second supporting surface constitutes a portion of an upper surface of the image forming apparatus.

Further features of the present invention will become apparent from the following description of exemplary embodiments with reference to the attached drawings.

DESCRIPTION OF THE EMBODIMENTS

First Embodiment

Figure 1:
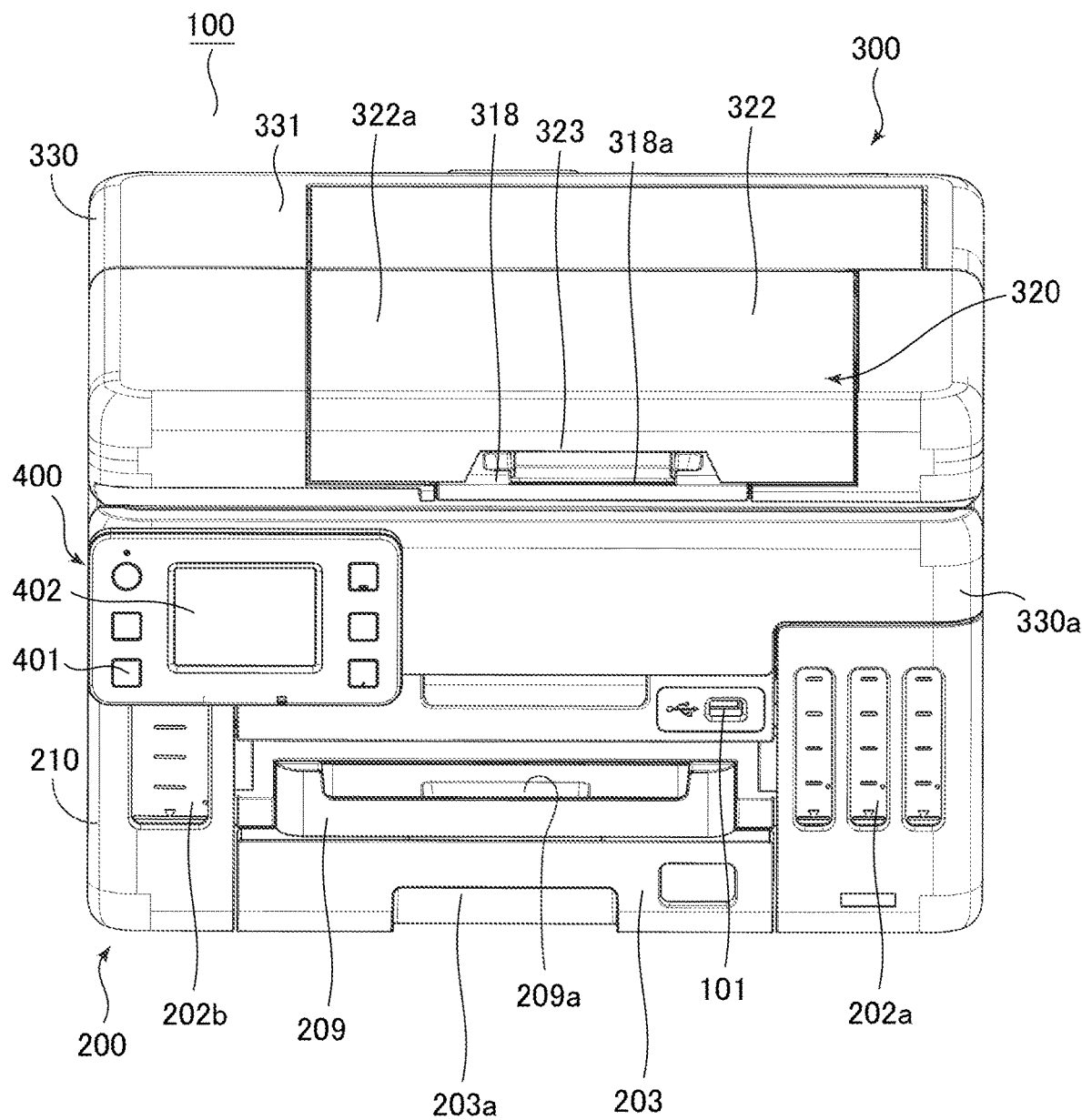
FIG. 1 is a perspective view of an image forming apparatus according to a first embodiment as viewed from a front side.

A first embodiment will be described with reference to FIGS. 1 to 26B. First, a schematic configuration of an image forming apparatus according to the present embodiment will be described with reference to FIGS. 1 to 4.

Image Forming Apparatus

An image forming apparatus 100 is a printer capable of forming a full-color image, and in the present embodiment, includes an apparatus main body 200 having an image forming unit 201 that forms an image on a sheet, and an image reading apparatus 300 having a reading unit 301 serving as an image reading unit that reads an image on a document. The image reading apparatus 300 is provided in an upper portion of the apparatus main body 200. Note that, in the following description, the sheet includes, in addition to plain paper, special paper such as coated paper, a recording material having a special shape such as an envelope or index paper, and a plastic film for an overhead projector or cloth, and a document is an example of the sheet.

Figure 2:
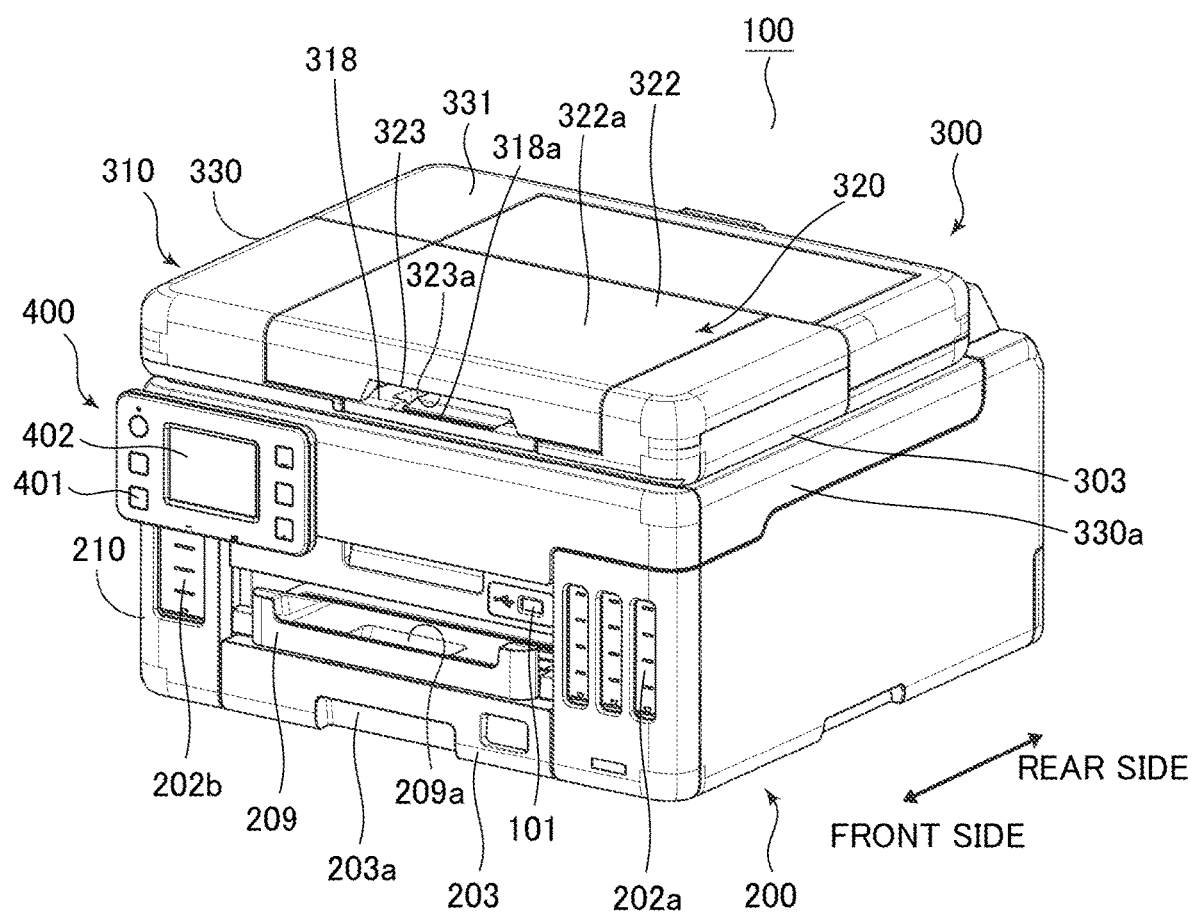
FIG. 2 is a perspective view of the image forming apparatus according to the first embodiment as viewed from a right front side.
Figure 3:
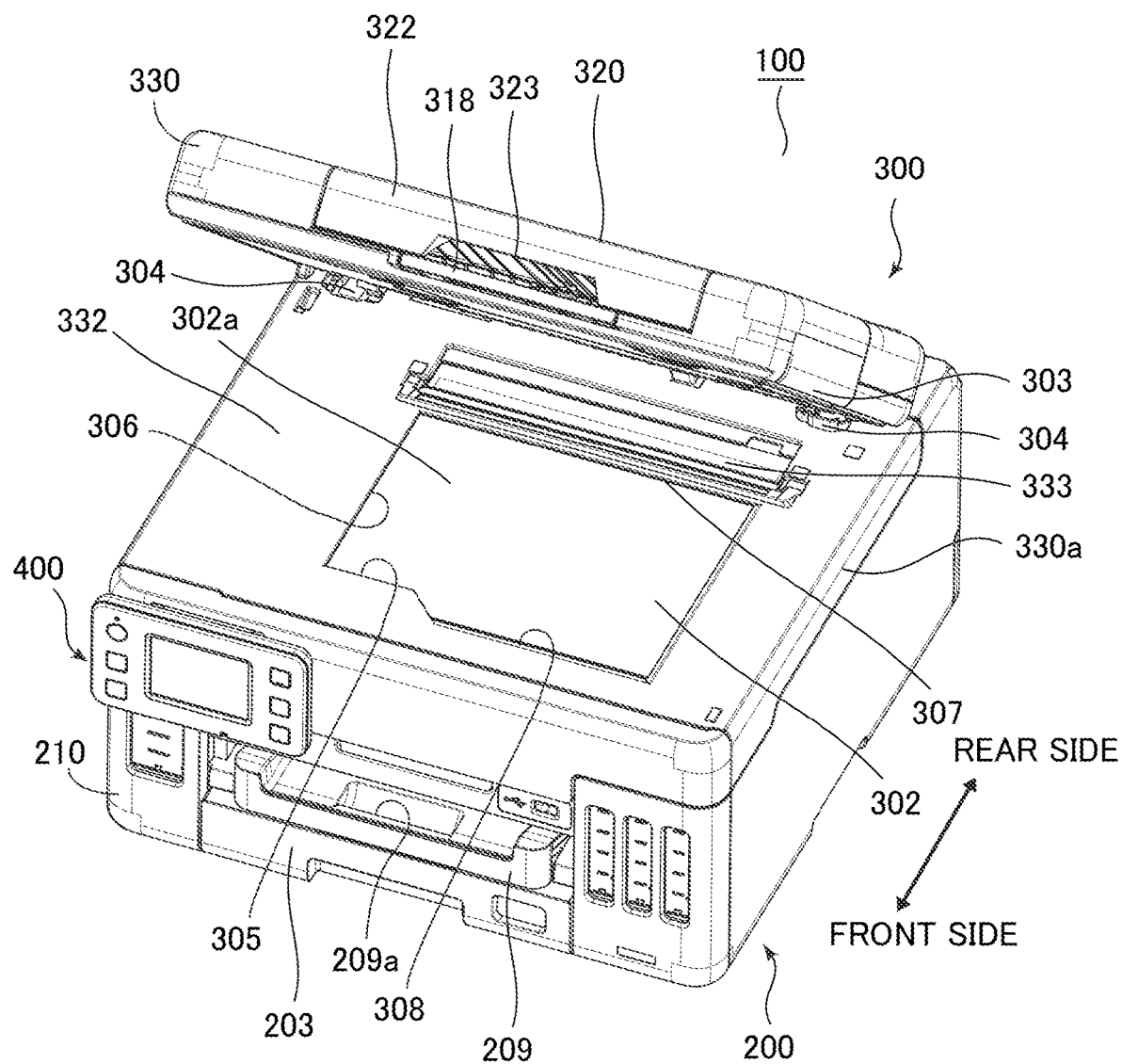
FIG. 3 is a perspective view illustrating a state in which a pressure plate of the image forming apparatus according to the first embodiment is opened.
Figure 4:
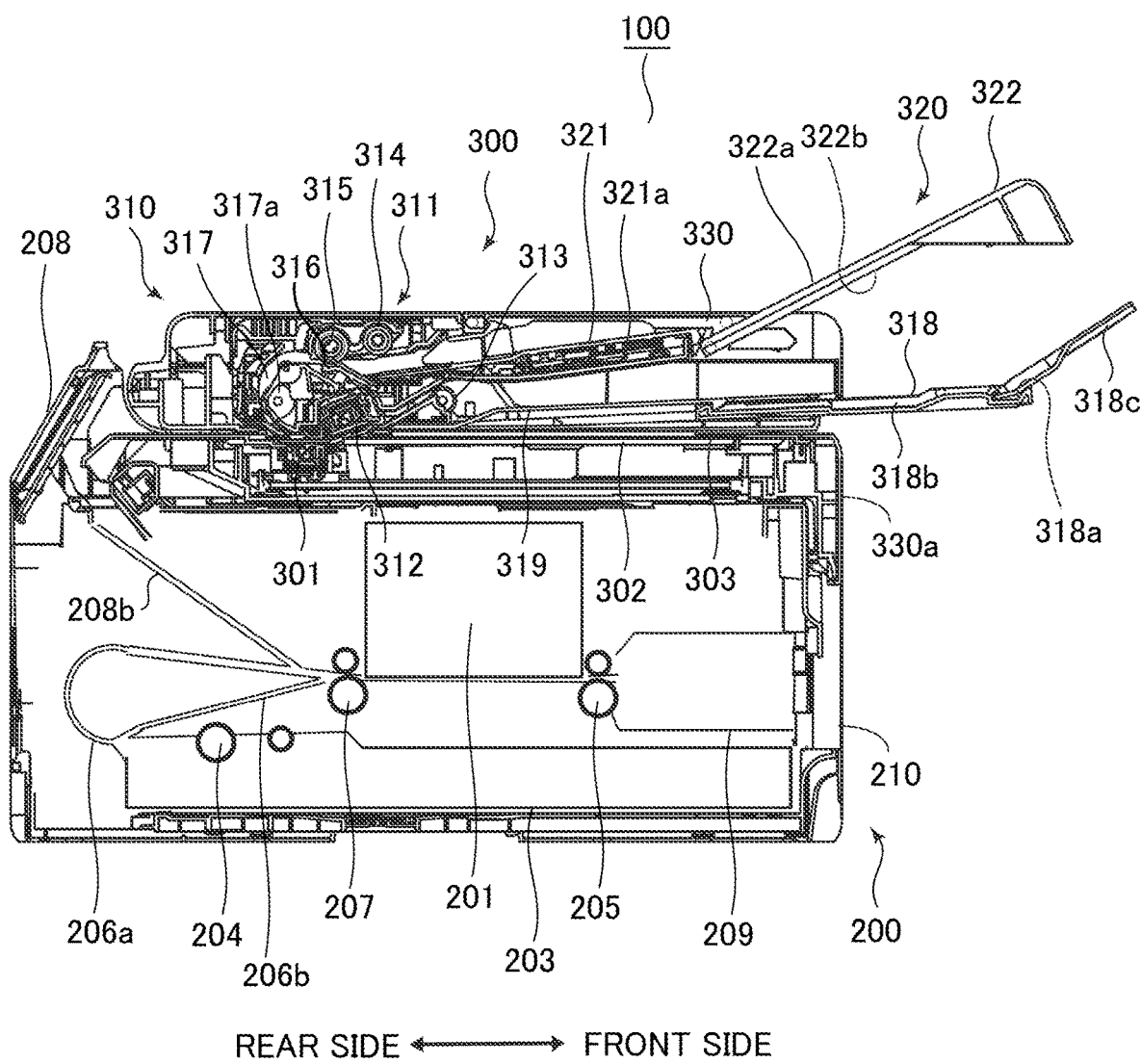
FIG. 4 is a cross-sectional view illustrating schematic configuration of the image forming apparatus according to the first embodiment.

The image forming apparatus 100 is provided with an operation panel 400 serving as an operation unit for receiving an operation by an operator on the apparatus front side (front side in FIG. 1, left front side in FIGS. 2 and 3, right side in FIG. 4). The operation panel 400 includes a physical switch 401 such as a start button, and a display portion 402 such as a liquid crystal screen capable of displaying various types of information and performing a touch operation. In the present embodiment, as illustrated in FIGS. 1 and 2, the operation panel 400 is disposed on the front surface (the surface on the apparatus front side) of the image forming apparatus 100 so as to be shifted to the left side from the apparatus center when the apparatus is viewed from the front surface side. Note that the operation panel 400 may be shifted rightward.

Hereinafter, the side on which the operation panel 400 is disposed is referred to as an apparatus front side, a front side, and the opposite side is referred to as an apparatus rear side, a rear side, or a back side (rear side of FIG. 1, right rear side of FIGS. 2 and 3, left side of FIG. 4). When simply referred to as "right" or "left", it is assumed that the image forming apparatus 100 is viewed from the front side. Further, a direction from the apparatus front side toward the apparatus rear side and a direction from the apparatus rear side toward the apparatus front side are referred to as a front-rear direction, and a left-right direction when the image forming apparatus 100 is viewed from the front side is simply referred to as a "left-right direction" or a "width direction".

In the present embodiment, as will be described later, the image forming unit 201 is an inkjet image forming unit that ejects ink onto a sheet to form an image. Therefore, remaining amount display portions 202a and 202b that display the remaining amount of ink used in the image forming unit 201 are arranged on the apparatus front side of the image forming apparatus 100. The remaining amount display portion 202a on the right side of the image forming apparatus 100 indicates the remaining amount of yellow, magenta, and cyan inks, and the remaining amount display portion 202b on the left side indicates the remaining amount of black ink. In the present embodiment, the remaining amount display portions 202a and 202b are windows formed so that the remaining amount of ink in the ink tank of each color can be seen, but may be a display portion such as a liquid crystal screen that displays an image corresponding to the remaining amount of ink of each color. Furthermore, the positions of the remaining amount display portions of the color ink and the black ink may be reversed left and right, or may be collectively arranged on either left or right.

A USB terminal 101 for connection with an external terminal of a personal computer or the like is provided on the front surface of the image forming apparatus 100. The USB terminal 101 may be provided on a right side surface or a left side surface of the image forming apparatus 100, or may be provided on a back surface thereof. In the present embodiment, the USB terminal 101 is provided on the front surface of the image forming apparatus 100 in order to improve operability from the front surface of the image forming apparatus 100.

Apparatus Main Body

Next, the apparatus main body 200 will be described. As illustrated in FIG. 4, the apparatus main body 200 includes a cassette 203, a pickup roller 204 serving as a sheet feeding unit, an image forming unit 201, a sheet discharge roller pair 205 serving as a sheet discharge portion, and the like. The cassette 203 serving as a sheet supporting portion supports a sheet. The pickup roller 204 feeds a sheet supported by the cassette 203. The image forming unit 201 forms an image on the sheet fed by the pickup roller 204. The sheet discharge roller pair 205 discharges the sheet on which the image is formed by the image forming unit 201. Details will be described below.

The cassette 203 can store a plurality of sheets, and the plurality of sheets are supported in a state of being stacked in the cassette 203. The cassette 203 can be inserted into and drawn out of the casing 210 of the apparatus main body 200. The drawing direction of the cassette 203 is the apparatus front side. That is, when the sheet is stored in the cassette 203, the cassette 203 is drawn out to the apparatus front side. Then, the cassette 203 containing the sheets is pushed into the apparatus rear side to attach the cassette 203 to the casing 210. For this purpose, on the apparatus front side of the cassette 203, a cassette gripping portion 203a (see FIGS. 1, 2, and the like) for the operator to grip with a hand and draw out the cassette 203 is provided.

The pickup roller 204 picks up a sheet in the cassette 203. The uppermost sheet in the cassette 203 is picked up by the pickup roller 204 and fed toward a conveyance path 206a. In the present embodiment, the pickup roller 204 feeds a sheet in a sheet feeding direction from the apparatus front side toward the apparatus rear side. The sheet feeding direction in which the pickup roller 204 feeds the sheet may be a direction from the apparatus rear side toward the apparatus front side.

The sheet conveyed in the conveyance path 206a reaches a registration roller pair 207 serving as a conveying member that conveys the sheet. The sheet conveyed from the conveyance path 206a abuts on the registration roller pair 207 in a state where the rotation is stopped. Accordingly, skew feeding of the sheet is corrected. Next, the registration roller pair 207 starts to rotate in accordance with the image forming timing by the image forming unit 201, and sends the sheet to the image forming unit 201.

On the upstream side in the sheet conveying direction of the registration roller pair 207, a reverse conveyance path 206b for reversing the sheet conveyed in the reverse direction of the sheet conveying direction and sending the sheet to the image forming unit 201 is provided. When images are formed on both sides of a sheet, the image forming unit 201 forms an image on one side of the sheet conveyed from the conveyance path 206a. Next, the sheet on which the image is formed on one side is conveyed in the reverse direction, the conveyance path is switched by a switching member (not illustrated), and the sheet is guided to the reverse conveyance path 206b. Then, the reversed sheet reaches the registration roller pair 207 again, and an image is formed on the back surface of the sheet by the image forming unit 201.

In addition, in the present embodiment, the manual feed tray 208 is provided in an upper portion on the apparatus rear side of the image forming apparatus 100. The manual feed tray 208 is pivotable between a storage position illustrated in FIG. 4 and a placing position at which the tray is opened from the storage position and sheets can be placed thereon. The sheet can be fed into the apparatus at the placing position. Specifically, the sheet placed on the manual feed tray 208 is conveyed to the conveyance path 208b by a feeding roller (not illustrated). The sheet conveyed in the conveyance path 208b reaches the registration roller pair 207. Hereinafter, the sheet is processed similar to the sheet conveyed from the cassette 203. Note that the manual feed tray 208 is provided on the rear side of the image reading apparatus 300, and does not protrude from the back surface of the casing 210 of the apparatus main body 200 and the upper surface of the image reading apparatus 300 at the storage position.

As described above, the image forming unit 201 employs an inkjet system that ejects ink to form an image on a sheet. That is, a recording head capable of ejecting the ink of each color is provided, and the recording head of each color ejects the ink toward the sheet conveyed by the registration roller pair 207 according to an image signal input from the image reading apparatus 300 or an external terminal. As a result, an image is formed on the sheet. The image forming unit 201 may be an electrophotographic image forming unit using toner.

The sheet discharge roller pair 205 discharges the sheet on which the image is formed by the image forming unit 201 to the discharge tray 209. The sheet discharge roller pair 205 discharges the sheet in a sheet discharge direction from the apparatus rear side toward the apparatus front side. The discharge tray 209 can be inserted into and drawn out from the casing 210. The drawing direction of the discharge tray 209 is on the apparatus front side. For this reason, on the apparatus front side of the discharge tray 209, a discharge tray gripping portion 209a (see FIGS. 1, 2, and the like) is provided for the operator to grip with a hand and draw out the discharge tray 209.

Image Reading Apparatus

Next, the image reading apparatus 300 will be described. As illustrated in FIGS. 3 and 4, the image reading apparatus 300 includes an automatic document feeder (ADF) 310 serving as an automatic document feeding apparatus, a platen glass 302, a pressure plate 303 serving as a document pressing portion, two hinges 304 (FIG. 3) serving as pivot supporting portions, a reading unit 301, and the like. The image reading apparatus 300 according to the present embodiment can execute a so-called feeding-reading mode in which an image on a document is read by the reading unit 301 while the document is conveyed by the ADF 310, and a so-called fixed-reading mode in which an image on a document is read by moving the reading unit 301 in a state where the document is placed on the platen glass 302 and the document is pressed against the platen glass 302 by the pressure plate 303.

In the present embodiment, the maximum size of the document for which an image is read is different between the feeding-reading mode and the fixed-reading mode, and the maximum size of the corresponding document is smaller in the fixed-reading mode. For example, the maximum size of the document corresponding to the feeding-reading mode is A4 size, and the maximum size of the document corresponding to the fixed-reading mode is A5 size. However, the maximum sizes of the documents corresponding to both the modes may be the same. Note that the "maximum size" in the present embodiment means the maximum size that can be read by the image reading apparatus described in, for example, a specification or an instruction manual of the apparatus.

Platen Glass and Pressure Plate

First, a configuration related to the platen glass 302 and the pressure plate 303 will be described with reference to FIGS. 1 to 3. The platen glass 302 is a plate-like transparent member having a document placing surface 302a on which a document is placed. That is, the image reading apparatus 300 includes a platen 332, and the platen glass 302 and a reading glass 333 are provided on the platen 332. The upper surface of the platen glass 302 serves as the document placing surface 302a.

The platen glass 302 is provided in the entire range where the reading unit 301 moves to perform reading so that the image on the document placed on the platen glass 302 can be read by the reading unit 301 when the fixed-reading mode is performed. On the other hand, the reading glass 333 is a transparent member provided at an image reading position (feeding-reading position) at a position away from the platen glass 302, and is different from the platen glass 302. That is, the reading glass 333 is provided at a position where the reading unit 301 stops when the feeding-reading mode is performed. When the feeding-reading mode is performed, the reading unit 301 moves to a position facing the reading glass 333 and reads an image on a document conveyed by the ADF 310 described later via the reading glass 333.

The pressure plate 303 serving as a document pressing portion presses the document placed on the platen glass 302 against the platen glass 302. The pressure plate 303 is supported with respect to a casing 330a on the platen 332 side of the image reading apparatus 300 together with the ADF 310 to be described later so as to be pivotable between a closed position illustrated in FIGS. 1 and 2 and an open position illustrated in FIG. 3 by a hinge 304 serving as a pivot supporting portion.

The closed position is a position where the document is pressed against the platen glass 302 by the pressure plate 303. The open position is a position where the platen glass 302 is opened so that the document can be placed on the platen glass 302. The hinge 304 pivotably supports the pressure plate 303 with respect to the casing 330a of the image reading apparatus 300 about a pivot shaft (pivot axis). The pivot shaft is disposed to extend in a direction along a width direction (left-right direction) that is a direction orthogonal to a direction from the apparatus front side toward the apparatus rear side and the vertical direction.

In addition, the hinge 304 is disposed closer to the apparatus rear side than the platen glass 302, and a gripping portion 323 configured to be gripped to pivot the pressure plate 303 from the closed position to the open position is disposed at an end of the pressure plate 303 on the apparatus front side. The gripping portion 323 is a recess portion formed on the end face of the pressure plate 303 on the apparatus front side so that the operator can lift the pressure plate 303 by putting a hand in order to pivot the pressure plate 303 to the open position. Note that the gripping portion 323 can be pushed down with a hand in order to pivot the pressure plate 303 from the open position to the closed position. As described later, such a gripping portion 323 also serves as a gripping portion for drawing out the sub-tray 322 of the document feed tray 320.

In the present embodiment, as described above, the hinge 304 is disposed on the apparatus rear side, and the gripping portion 323 is disposed on the apparatus front side. Therefore, the operator grips the gripping portion 323 from the apparatus front side to open and close the pressure plate 303.

For example, when pivoting the pressure plate 303 from the closed position to the open position, the operator grips the gripping portion 323 and lifts the pressure plate 303. At this time, the end of the pressure plate 303 on the apparatus front side passes through a trajectory such that the end is positioned on the apparatus rear side as it goes upward about the pivot shaft of the hinge 304.

As illustrated in FIG. 3, in order to position a document at a reference position for reading the document by the reading unit 301, the end of the platen glass 302 is provided with a first abutment portion 305 and a second abutment portion 306 against which the edge portion of the document placed on the document placing surface 302a abuts. The first abutment portion 305 performs positioning of the document in the front-rear direction, and the second abutment portion 306 performs positioning of the document in the left-right direction. A detailed description will be given later.

ADF

Next, the ADF 310 will be described with reference to FIGS. 4 and 5. The ADF 310 is provided in the pressure plate 303, and includes a document feed tray 320, a document feeding portion 311, a back surface reading unit 312, a sheet discharge roller 313 serving as a document discharge portion, and the like. The document feed tray 320 serving as a document supporting portion supports a document. The document feeding portion 311 feeds a document supported by the document feed tray 320. The back surface reading unit 312 reads the image on the back side of the document fed by the document feeding portion 311. Note that the image on the surface of the document is read by the reading unit 301 serving as an image reading unit. The sheet discharge roller 313 discharges the document whose image has been read by the reading unit 301 or the back surface reading unit 312. In the present embodiment, the maximum size of the document that can be conveyed by the ADF 310 is the A4 vertical size. That is, it is possible to convey the document such that the longitudinal direction of the A4-size document is the conveying direction as the maximum document size. Details will be described below.

At least a part of the document feed tray 320 is slidably arranged on the apparatus front side with respect to the casing 330 on the ADF 310 side of the image reading apparatus 300. Specifically, the document feed tray 320 includes a main body tray 321 serving as a first supporting portion having a first supporting surface 321a that supports the document, and a sub-tray 322 serving as a second supporting portion and a slide supporting portion having a second supporting surface 322a that supports the document together with the first supporting surface 321a. The sub-tray 322 is arranged so as to be slidable between a first position with respect to the casing 330 having the pressure plate 303 and a second position closer to the apparatus front side than the first position, and forms a supporting surface capable of supporting the document at the second position. Details of the document feed tray 320 will be described later.

The document feeding portion 311 includes a pickup roller 314, a separation roller 315, a separation pad 316, and the like. The pickup roller 314 picks up the uppermost document placed on the document feed tray 320. The separation roller 315 and the separation pad 316 are pressed against each other to form a separation nip, and the documents picked up by the pickup roller 314 are separated one by one and conveyed to the conveyance path 317. The document feeding portion 311 feeds a document in a document feeding direction from the apparatus front side to the apparatus rear side.

A conveying roller 317a serving as a document conveying portion that conveys a document is provided in the middle of the conveyance path 317, and the document separated and conveyed by the separation roller 315 is further conveyed downstream by the conveying roller 317a. That is, the conveying roller 317a conveys the document fed by the document feeding portion 311 toward the image reading position. Then, the image on the front surface of the document is read by the reading unit 301 located at the image reading position. Further, a back surface reading unit 312 is disposed at a position facing the back surface of the document passing through the conveyance path 317 on the downstream side of the image reading position in the conveying direction of the document in the conveyance path 317. When the operator instructs to read the back surface of the document, the back surface reading unit 312 also reads an image on the back surface of the document.

The sheet discharge roller 313 discharges the document whose image has been read by the reading unit 301 or the back surface reading unit 312 to the document discharge tray 319. The sheet discharge roller 313 discharges the document in a document discharge direction from the apparatus rear side to the apparatus front side.

The document discharged from the sheet discharge roller 313 is stacked on the document discharge tray 319 serving as a document stacking portion. The document discharge tray 319 includes a supporting surface integrally formed with the casing 330 and an extension tray 318 that can be inserted into and drawn out of the casing 330. The drawing direction of the extension tray 318 serving as the extension stacking portion is on the apparatus front side. For this purpose, a discharge tray gripping portion 318a (see FIGS. 1, 2, and the like) for the operator to grip and draw out the extension tray 318 is provided on the apparatus front side of the extension tray 318. Details of the extension tray 318 will be described later.

Reading Unit

The reading unit 301 and the back surface reading unit 312 are, for example, contact image sensors (CIS). The CIS reads image information of a document by irradiating a surface on which an image on the document is present with light from a light source such as an LED and forming reflected light reflected from the surface on a sensor element by a self-focusing rod lens array. As will be described later, the reading unit 301 that reads the front surface of the document is movable inside the platen glass 302, and is stopped at the image reading position when reading an image on the document conveyed by the ADF 310 (that is, in the case of the feeding-reading mode).

Figure 6:
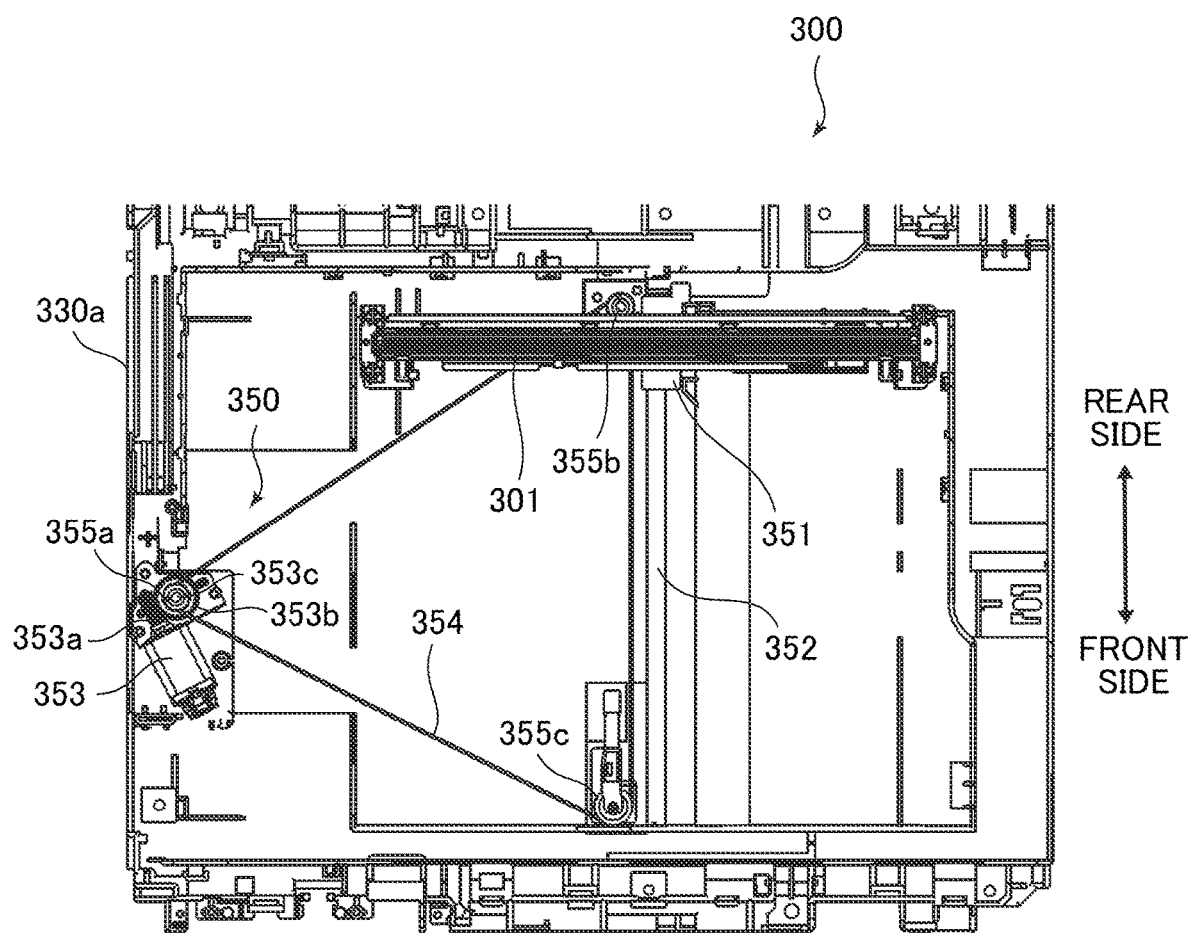
FIG. 6 is a plan view illustrating a drive configuration of a reading unit of the image reading apparatus according to the first embodiment.

In the present embodiment, the reading unit 301 is configured to move in the front-rear direction of the apparatus as illustrated in FIG. 6. That is, the reading unit 301 is disposed inside the casing 330a of the image reading apparatus 300 on the side opposite to the pressure plate 303 with respect to the platen glass 302. Inside the casing 330a, a reading moving unit 350 that reciprocates the reading unit 301 in a direction orthogonal to the pivot shaft of the hinge 304 is provided. The direction in which the reading moving unit 350 moves the reading unit 301 is a direction from the apparatus front side toward the apparatus rear side and a direction opposite to this direction, that is, the front-rear direction of the apparatus. Therefore, the direction in which the reading unit 301 moves is a direction along the direction in which the document is fed by the document feeding portion 311.

The reading moving unit 350 includes a carriage 351, a rail 352 serving as a guide portion, a carriage motor 353, a belt 354, and the like. The carriage 351 supports the reading unit 301. The rail 352 guides the carriage 351 in a direction from the apparatus front side toward the apparatus rear side and in a direction opposite to this direction. The carriage motor 353 is a drive source that moves the carriage 351. The belt 354 is a power transmission unit that transmits the drive of the carriage motor 353 to the carriage 351 to move the carriage 351. Hereinafter, a specific description will be given.

The reading unit 301 is disposed such that the longitudinal direction, which is the main scanning direction, is a direction along the width direction of the apparatus. The length of the reading unit 301 in the longitudinal direction is, for example, such that an image within the range of the length in the short direction of the A4 size can be read. The carriage 351 supports the reading unit 301 such that the longitudinal direction of the reading unit 301 is maintained in the direction along the width direction even when the reading unit 301 moves in the front-rear direction (that is, the sub scanning direction). The rail 352 is disposed in a direction along the front-rear direction of the apparatus, supports the carriage 351, and guides the carriage 351 in the front-rear direction.

The carriage motor 353 is disposed at a position deviated from the document placing surface 302a in any one of the width directions. In the present embodiment, as described above, the carriage motor 353 is arranged on the left side which is the side on which the operation panel 400 is arranged. That is, the carriage motor 353 is disposed on the left side of the document placing surface 302a in the width direction and on the rear side of the operation panel 400 in the front-rear direction. Note that the carriage motor 353 may be arranged on the right side of the document placing surface 302a in the width direction, but as will be described in detail later, it is preferable to arrange the carriage motor on the side opposite to the side where a conveyance center of the document is shifted from the center of the apparatus.

The belt 354 is stretched between a drive pulley 355a serving as a drive stretching portion, a first pulley 355b serving as a first stretching portion, and a second pulley 355c serving as a second stretching portion. The carriage 351 is fixed to a portion of the belt 354 stretched between the first pulley 355b and the second pulley 355c. As a result, the belt 354 is driven and rotated by the carriage motor 353, so that the carriage 351 can reciprocate between the first pulley 355b and the second pulley 355c.

The drive pulley 355a is a pulley that is disposed on one side in the width direction with respect to the document placing surface 302a together with the carriage motor 353 and transmits the drive of the carriage motor 353. In the present embodiment, the drive pulley 355a is provided on an output shaft 353c of a speed reducer 353b that decelerates and outputs the drive of the drive shaft 353a of the carriage motor 353. In the present embodiment, as described above, the carriage motor 353, the speed reducer 353b, and the drive pulley 355a are collectively arranged in any one space in the width direction of the document placing surface 302a. Accordingly, it is possible to effectively use a space generated by shifting the conveyance center of the document from the center of the apparatus.

The first pulley 355b is disposed further closer to one side than the moving end on one side (apparatus rear side) of the carriage 351 in the direction along the moving direction of the carriage 351, that is, the front-rear direction. As will be described later, the reading glass 333 at the image reading position is provided closer to the apparatus rear side than the document placing surface 302a of the platen glass 302. Therefore, in the present embodiment, the moving end on the apparatus rear side of the carriage 351 is a position where the reading unit 301 can be located at the image reading position. The first pulley 355b is provided at a position where the carriage 351 can move until the reading unit 301 is located at the image reading position.

Note that, for example, in a case where the reading unit 301 moves further closer to the apparatus rear side than the reading glass 333, such as a case where the home position of the reading unit 301 is closer to the apparatus rear side than the reading glass 333, the position where the reading unit 301 can move to the position on the apparatus rear side is the moving end on the apparatus rear side of the carriage 351.

The second pulley 355c is disposed further closer to the other side than the moving end on the other side (apparatus front side) of the carriage 351 in the front-rear direction. In the present embodiment, the home position of the reading unit 301 is set to the end on the apparatus front side in the movement range of the reading unit 301. For example, a position closer to the apparatus front side than the platen glass 302 is set as a home position of the reading unit 301. Therefore, in the present embodiment, the moving end of the carriage 351 on the apparatus front side is a position where the reading unit 301 can be located at the home position. The second pulley 355c is provided at a position where the carriage 351 can move until the reading unit 301 is located at the home position.

Note that the home position may be a position on the apparatus rear side as described above. In this case, the moving end of the carriage 351 on the apparatus front side is a position where the reading unit 301 can be positioned at the end on the front side of the scanning range in the sub-scanning direction.

As described above, in the present embodiment, since the drive pulley 355a is disposed on the left side of the apparatus, the first pulley 355b is disposed on the apparatus rear side, and the second pulley 355c is disposed on the apparatus front side, the belt 354 is stretched in a substantially triangular shape as illustrated in FIG. 6. A portion of the belt 354 stretched between the first pulley 355b and the second pulley 355c is substantially parallel to the arrangement direction of the rail 352. Therefore, by driving the carriage motor 353 to rotate the belt 354, the reading unit 301 supported by the carriage 351 reciprocates between the first pulley 355b and the second pulley 355c along the rail 352. Accordingly, the reading unit 301 is moved to the image reading position in the feeding-reading mode, or the reading unit 301 is moved in the front-rear direction in the fixed-reading mode.

In the present embodiment, the reading moving unit 350 moves the reading unit 301 from the apparatus front side to the apparatus rear side when reading an image on a document placed on the platen glass 302, that is, in the fixed-reading mode. That is, as will be described later, in the present embodiment, since the first abutment portion 305 that positions the document in the front-rear direction is provided on the apparatus front side, the reading unit 301 is moved from the apparatus front side to the apparatus rear side when the fixed-reading mode is performed.

Further, in the present embodiment, the home position of the reading unit 301 is set to the apparatus front side (the first abutment portion side). Therefore, when the fixed-reading mode is started, the distance for the reading unit 301 to move from the home position to the reading start position can be shortened, and the time lag from the instruction to start the reading by the operator to the actual start of the fixed-reading mode can be shortened. When the feeding-reading mode is executed, the reading unit 301 is moved from the home position to the image reading position.

Document Feed Tray

As described above, in the document feed tray 320 serving as the document supporting portion, the sub-tray 322 serving as the second supporting portion is slidable to the first position and the second position with respect to the main body tray 321 serving as the first supporting portion. The first position is a position where the sub-tray 322 covers the upper side of the main body tray 321 in a state where the second supporting surface 322a is positioned above the back surface 322b which is the back surface of the second supporting surface 322a. That is, the first position is a storage position at which the sub-tray 322 is stored in the casing 330, and is a position illustrated in FIGS. 1 and 2.

In the sub-tray 322, the second supporting surface 322a faces upward even in the state of being at the first position, and for example, the sub-tray does not pivot when being stored, and the back surface does not face upward. The second supporting surface 322a of the sub-tray 322 constitutes an upper surface of the exterior surface of the image reading apparatus 300 in a state of being located at the first position. That is, the second supporting surface 322a also serves as an exterior cover of the image reading apparatus 300.

In the present embodiment, in a state where the sub-tray 322 is at the first position, the sub-tray is in a state of being continuous with the upper surface portion 331 of the casing 330 with substantially no step, and in a state where the image forming apparatus 100 is installed at the installation place, the second supporting surface 322a and the upper surface portion 331 are substantially parallel to the horizontal plane. The sub-tray 322 located at the first position and the upper surface portion 331 are located on the same plane. Therefore, documents and the like can be placed on the second supporting surface 322a and the upper surface portion 331.

The second supporting surface 322a of the sub-tray 322 is continuous in a state where there is substantially no gap from the upper surface portion 331 in the state of being at the first position or in a state where there is a slight gap (for example, 1 mm or less), but a gap larger than this gap may be present between the second supporting surface 322a and the upper surface portion 331. In addition, there may be a step between the second supporting surface 322a and the upper surface portion 331, or the second supporting surface 322a may be inclined with respect to the horizontal plane in a state of being at the first position. In the sub-tray 322, the second supporting surface 322a may not be exposed upward when stored in the casing 330. For example, it may be configured to be stored below the top surface portion of the casing 330 and above the main body tray 321. In short, the sub-tray 322 may be configured to be stored above the main body tray 321 by sliding.

The second position is a position where the second supporting surface 322a supports the document together with the first supporting surface 321a in a state where the second supporting surface 322a is positioned above the back surface 322b. That is, the second position is a position illustrated in FIGS. 4 and 5, and is a document setting position where a document is set. In the sub-tray 322, in the state of being at the second position, the inclination angle of the second supporting surface 322a with respect to the horizontal plane is larger than that of the first supporting surface 321a. The inclination direction of the second supporting surface 322a at this time is a direction inclined downward toward the downstream side with respect to the feeding direction of the document.

In the present embodiment, the sub-tray 322 is positioned at the second position by drawing out the sub-tray 322 from the first position to the apparatus front side. That is, the direction in which the sub-tray 322 is slid from the first position to the second position is a direction from the apparatus rear side to the apparatus front side. When the sub-tray 322 is returned from the second position to the first position, the sub-tray 322 is pushed into the apparatus rear side while returning the inclination of the sub-tray 322 to the state of being at the first position, thereby positioning the sub-tray 322 at the first position. The sub-tray 322 is slidably supported at the first position and the second position by the slide movement supporting portion 340. The slide movement supporting portion 340 will be described later.

Further, a gripping portion 323 serving as a slide movement gripping portion which grips the sub-tray 322 to slide the sub-tray 322 is provided at an end of the sub-tray on the apparatus front side. As illustrated in FIG. 5, the gripping portion 323 has a notch 323a cut out to open downward at a part of the end of the sub-tray 322 on the apparatus front side, and a recessed portion 323b recessed upward at the apparatus rear side of the notch 323a. When the sub-tray 322 is drawn out toward the apparatus front side, for example, the operator puts a finger into the recessed portion 323b and pulls the sub-tray 322 toward the apparatus front side. On the other hand, when the pressure plate 303 is pivoted from the closed position to the open position, for example, the operator puts a hand into the notch 323a and lifts the pressure plate 303.

The extension tray 318 is positioned below the notch 323a. Then, the discharge tray gripping portion 318a described above can be gripped by putting a hand into the notch 323a. In addition, it is also possible to pivot the pressure plate 303 at the open position to the closed position by putting a hand into the notch 323a and gripping and pushing down the discharge tray gripping portion 318a of the extension tray 318 in the state of not being drawn out, that is, in the inserted state.

In the present embodiment, as described above, the gripping portion 323 also serves as a gripping portion for performing a pull-out operation of the sub-tray 322 and an operation for opening and closing the pressure plate 303. For this purpose, as will be described in detail later, a locking portion 348 (FIG. 22) capable of locking the sub-tray 322 to the first position is provided. When the pressure plate 303 is opened and closed in this manner, the sub-tray 322 is prevented from being inadvertently drawn out from the first position, and operability is improved.

Document Discharge Tray

As described above, the extension tray 318 of the document discharge tray 319 can be drawn out to the apparatus front side. Specifically, the extension tray 318 includes an extension tray main body 318b and a pivot member 318c. The extension tray main body 318b is slidably supported by the casing 330 so as to be inserted into and drawn out from the casing 330. That is, the extension tray 318 can be drawn out from the casing 330 of the image reading apparatus 300 in the same direction as the direction in which the sub-tray 322 slides from the first position to the second position. Further, the extension tray 318 is positioned below the sub-tray 322 positioned at the second position in the drawn-out state.

Figure 5:
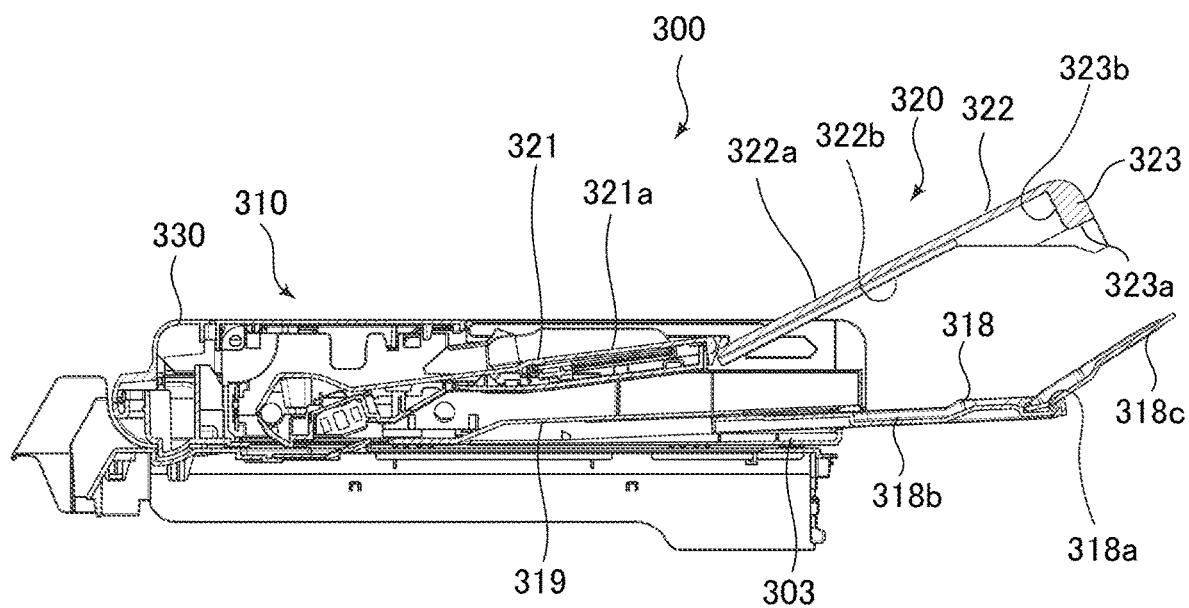
FIG. 5 is a cross-sectional view of an ADF according to the first embodiment.
Figure 7:
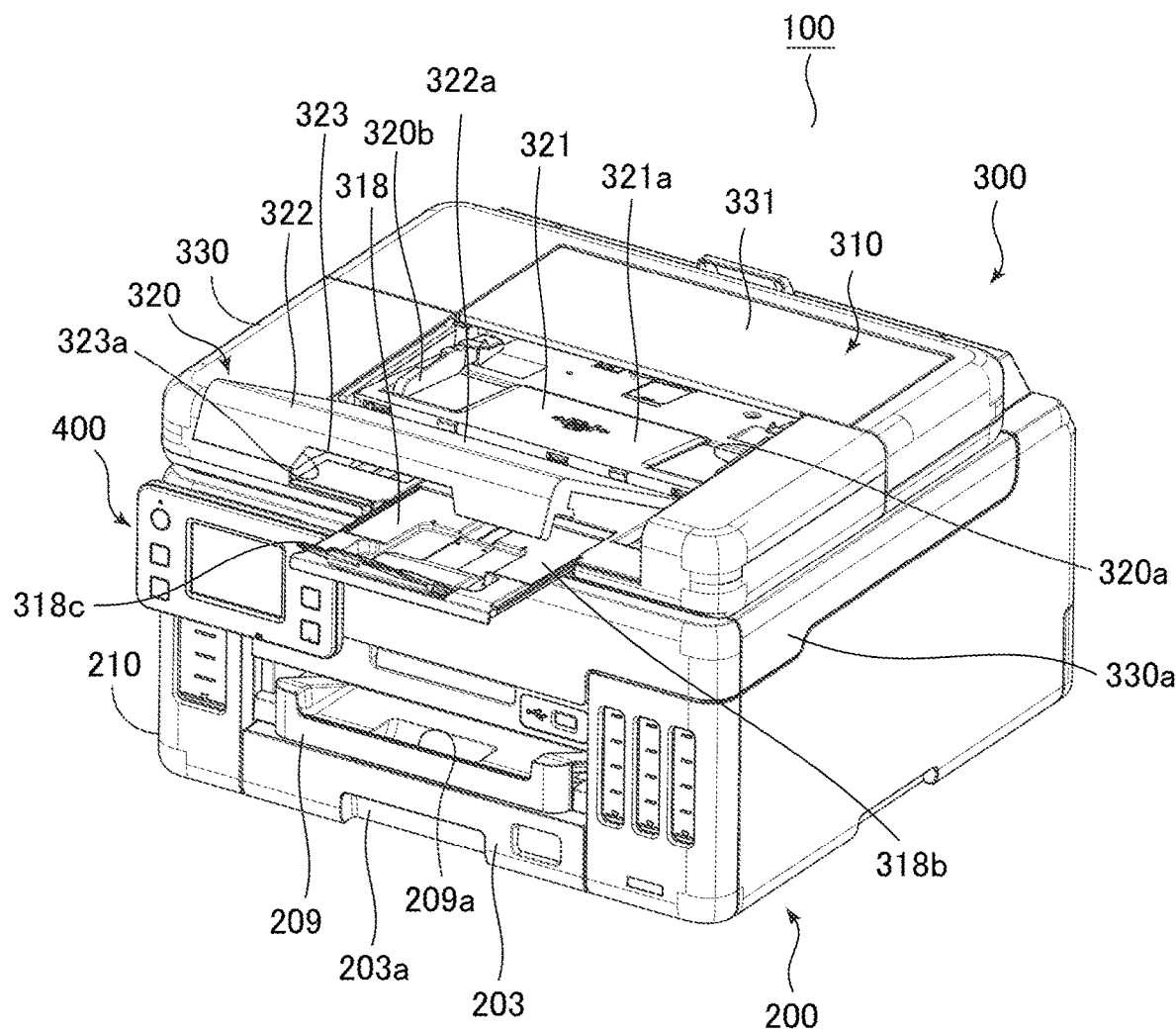
FIG. 7 is a perspective view illustrating a state in which a document feed tray and a document discharge tray of the image forming apparatus according to the first embodiment are drawn out.

The pivot member 318c is pivotably supported by an end of the extension tray main body 318b on the apparatus front side, and can support a document together with the extension tray main body 318b in an opened state as illustrated in FIGS. 4, 5, and 7. The pivot member 318c can suppress the discharged document from falling from the document discharge tray 319 in a state where the pivot member 318c rises with respect to the extension tray main body 318b. As illustrated in FIGS. 1 and 2, in a state where the pivot member 318c is folded toward the upper surface of the extension tray main body 318b, the extension tray 318 can be stored in the casing 330. Even in the folded state of the pivot member 318c, the back surface in the opened state of the pivot member 318c constitutes a placing surface for placing the document together with the extension tray main body 318b. Although the extension tray 318 in the present embodiment has the extension tray main body 318b and the pivot member 318c, the configuration of the extension tray 318 is not limited thereto. For example, the extension tray 318 may be formed only of the extension tray main body 318b and may not have the pivot member 318c.

Figure 8:
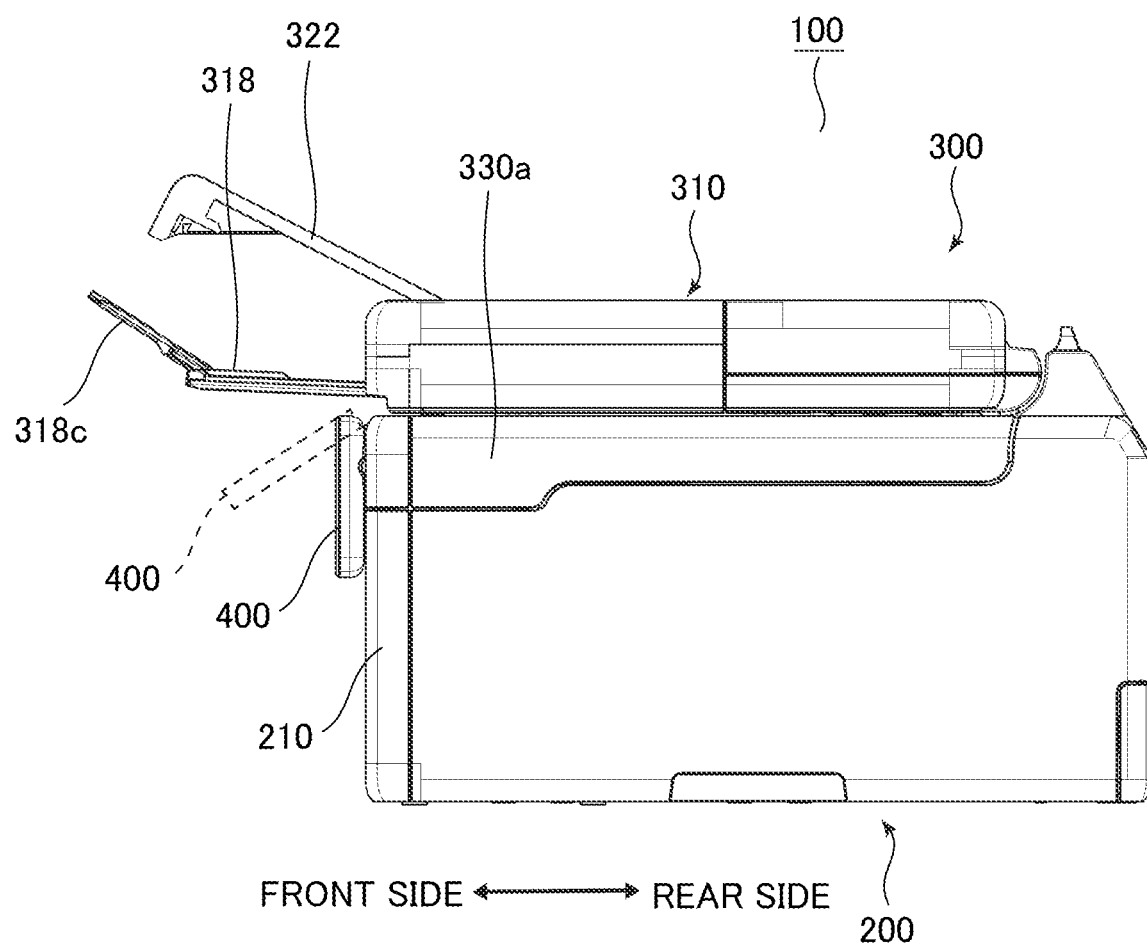
FIG. 8 is a side view illustrating a pivot range of an operation panel in a state where a document feed tray and a document discharge tray of the image forming apparatus according to the first embodiment are drawn out.
Figure 9:
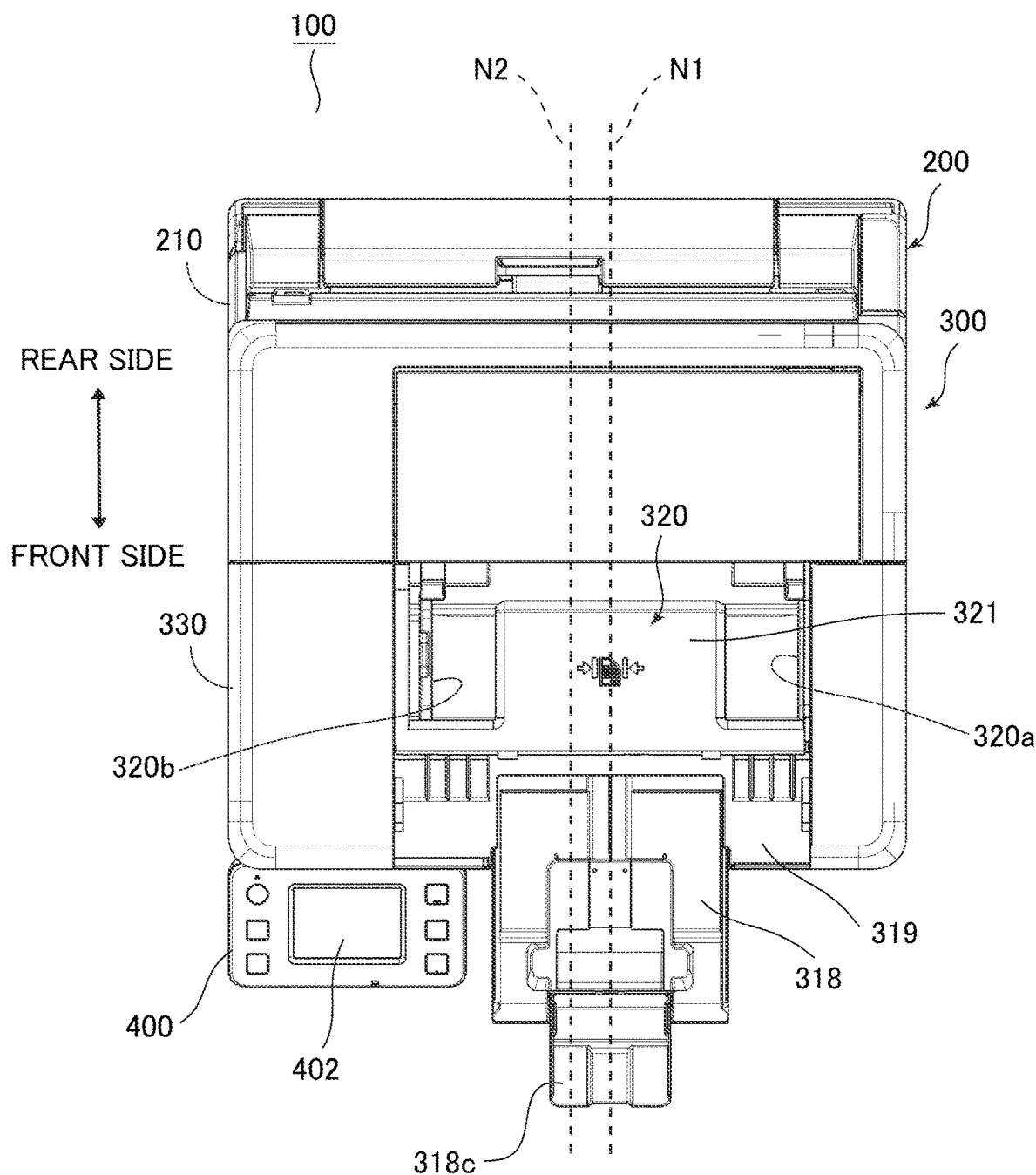
FIG. 9 is a plan view of the image forming apparatus illustrating a relationship between an apparatus center of the image forming apparatus according to the first embodiment and a document conveyance center.

Here, as illustrated in FIGS. 7, 8, and 9, in a state where the extension tray 318 is drawn out, the extension tray 318 is located at a position separated from the operation panel 400 in the width direction. In other words, the operation panel 400 is disposed at a position where the operation panel 400 dose not overlap the drawn-out extension tray 318 when viewed from above the image forming apparatus 100. As illustrated in FIG. 8, the operation panel 400 is supported on the casing 210 of the apparatus main body 200 or the casing 330a of the image reading apparatus 300 (the casing of the image forming apparatus 100) so as to be pivotable between a solid line position and a broken line position in the drawing around a pivot shaft disposed in parallel with the width direction in the vicinity of the upper end of the operation panel 400.

That is, the operation panel 400 is supported with respect to the casing of the image forming apparatus 100 so as to be pivotable between a first operation position where the display portion 402 faces the apparatus front side and a second operation position where the display portion 402 faces upward than the first operation position. Specifically, the solid line position of the operation panel 400 in FIG. 8 is the first operation position, and the surface (front surface) of the operation panel 400 on the apparatus front side is in the substantially vertical direction. On the other hand, the broken line position of the operation panel 400 in FIG. 8 is the second operation position, and the front surface of the operation panel 400 is inclined with respect to the vertical direction, and the front surface is directed obliquely upward.

If the operation panel 400 is disposed at a position overlapping at least a part of the extension tray 318 in the drawn-out state when viewed from above the image forming apparatus 100, operability of the operation panel 400 in a state where the extension tray 318 is drawn out is deteriorated. In particular, since the extension tray 318 is configured to be drawn out from the lower portion of the image reading apparatus 300 arranged in the upper portion of the apparatus main body 200 to the apparatus front side, the distance in the vertical direction between the extension tray 318 in the drawn-out state and the operation panel 400 is short. For this reason, for example, in a case where the operation panel 400 is set to the second operation position, if a part of the extension tray 318 in the drawn-out state overlaps the operation panel 400 when viewed from above, the visibility of the display portion 402 decreases, or the operability of the physical switch 401 or the display portion 402 decreases. Therefore, in the present embodiment, the extension tray 318 and the operation panel 400 do not overlap when the image forming apparatus 100 is viewed from above. However, it is sufficient that at least the display portion 402 of the operation panel 400 is arranged so as not to overlap the extension tray 318, and a portion other than the display portion 402 of the operation panel 400 may be arranged at a position overlapping the extension tray 318.

Note that the sub-tray 322 of the document feed tray 320 at least partially overlaps a part of the operation panel 400 when the image forming apparatus 100 is viewed from above, but the sub-tray 322 has less influence on the operability of the operation panel 400 than the extension tray 318. That is, since the sub-tray 322 is above the extension tray 318 and is drawn out in a state of being inclined upward, the distance in the vertical direction from the operation panel 400 is larger than that of the extension tray 318. Therefore, even if the operation panel 400 is at the second operation position, there is little influence on the operability of the operation panel 400.

It is preferable that the sub-tray 322 does not overlap the operation panel 400 when the image forming apparatus 100 is viewed from above. However, in this case, there is a possibility that the apparatus becomes large, for example, a deviation amount between the conveyance center of the document and the apparatus center described below is increased. Therefore, in the present embodiment, in order to improve the operability of the operation panel 400 while reducing the size of the apparatus, the extension tray 318 does not overlap the operation panel 400 when viewed from above, and the sub-tray 322 partially overlaps a part of the operation panel 400 when viewed from above.

Relationship Between Document Conveyance Center and Apparatus Center

Next, the relationship between the conveyance center of the document in the image reading apparatus 300 and the apparatus center of the image forming apparatus 100 will be described with reference to FIG. 9. First, the center in the left-right direction in the conveyance path of the document from the document feeding portion 311 to the sheet discharge roller 313 is defined as a conveyance center N1 of the document, and the center in the left-right direction in the outer shape of the image reading apparatus 300 is defined as an apparatus center N2. That is, the apparatus center N2 is a central portion in the width direction between both end faces in the width direction in the outer shape of the image reading apparatus 300.

On the other hand, the conveyance center N1 of the document is a center position in the width direction between the regulating surfaces 320a and 320b of a pair of regulating guides that regulate both ends in the width direction of the document in the document feed tray 320. In the present embodiment, the pair of regulating surfaces 320a and 320b are movable in directions approaching each other and separating from each other in the width direction according to the size of the document, and the position of the conveyance center N1 does not change regardless of the size of the document. In this configuration, the center position of the extension tray 318 in the width direction substantially coincides with the conveyance center N1.

Note that there is also a configuration in which, for a pair of restriction guides that restrict both ends in the width direction of the document in the document feed tray 320, the restriction guide on one side is fixed, and only the restriction guide on the other side is moved in the width direction in accordance with the size of the document. In this case, the position of the conveyance center N1 in the width direction is shifted depending on the size of the document. However, in such a case, even if the conveyance center N1 comes closest to the apparatus center N2, the conveyance center N1 is shifted with respect to the apparatus center N2. In addition, the direction of deviation is the same regardless of the document size. In this configuration, the center position of the extension tray 318 in the width direction is shifted from the conveyance center N1 depending on the size of the document.

The conveyance center N1 of the document is shifted to one of the left and right directions with respect to the apparatus center N2. In the present embodiment, the conveyance center N1 is shifted to the side opposite to the side where the operation panel 400 is shifted. In other words, the operation panel 400 is disposed such that the center of the operation panel 400 is shifted with respect to the apparatus center N2 in a direction (one side) opposite to a direction (the other side) in which the conveyance center N1 is shifted with respect to the apparatus center N2 in the left-right direction.

In the present embodiment, the operation panel 400 is shifted with respect to the apparatus center N2 to a position where the left end of the operation panel 400 substantially coincides with the left end of the casing 210 of the apparatus main body 200. However, the amount of deviation of the center of the operation panel 400 from the apparatus center N2 may be small. For example, although the center of the operation panel 400 in the width direction is shifted from the apparatus center N2, a part of the operation panel 400 may be located on the apparatus center N2. However, it is preferable that the entire operation panel 400 is shifted in the width direction with respect to the apparatus center N2. As described above, it is preferable to shift the operation panel 400 in the width direction with respect to the apparatus center N2 to a position not overlapping the extension tray 318 in the state of being drawn out when viewed from above.

The amount of deviation of the conveyance center N1 from the apparatus center N2 may also be small. For example, when the operation panel 400 is disposed such that the left end of the operation panel 400 substantially coincides with the left end of the casing 210 of the apparatus main body 200, a part of the extension tray 318 may overlap a part of the operation panel 400 when viewed from above. However, as described above, it is preferable to shift the conveyance center N1 and the apparatus center N2 so that the extension tray 318 and the operation panel 400 do not overlap when viewed from above. When viewed from above, it is more preferable to shift the conveyance center N1 and the apparatus center N2 so that the sub-tray 322 and the operation panel 400 do not overlap each other. The same applies to a configuration in which the restriction guide on one side is fixed and only the restriction guide on the other side is moved in the width direction according to the size of the document.

Furthermore, since the conveyance center N1 is deviated from the apparatus center N2, the area where the document does not pass increases on the side opposite to the conveyance center N1 in the left-right direction of the casing 330. Therefore, it is preferable that a motor and a gear (not illustrated) for driving each roller of the document feeding portion 311 are stored on the side opposite to the conveyance center N1 with respect to the apparatus center N2. That is, in the present embodiment, a motor and a gear (not illustrated) for driving each roller of the document feeding portion 311 are stored on the left side of the casing 330. Accordingly, it is possible to effectively use a space generated by shifting the conveyance center N1 of the document from the apparatus center N2.

Sliding Movement Supporting Portion

Figure 10:
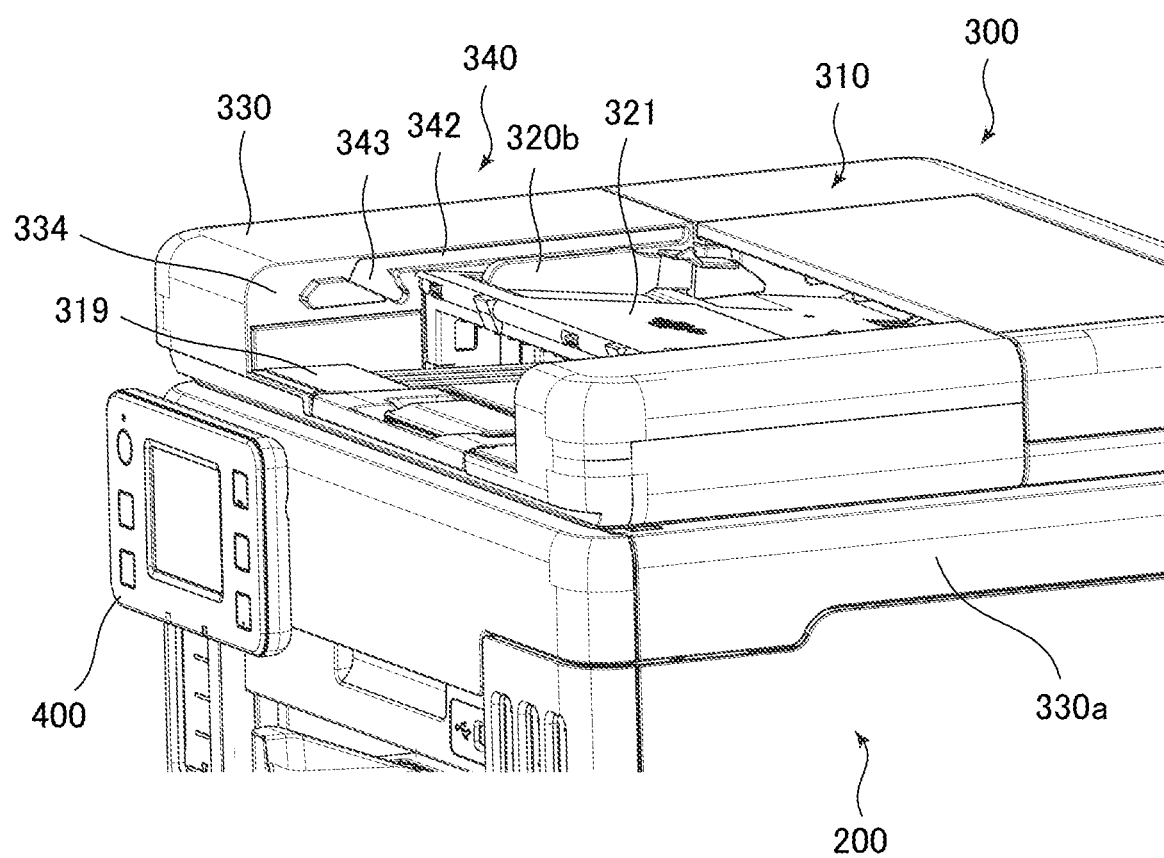
FIG. 10 is an enlarged perspective view illustrating the periphery of a slide rail according to the first embodiment with a sub-tray removed.
Figure 11:
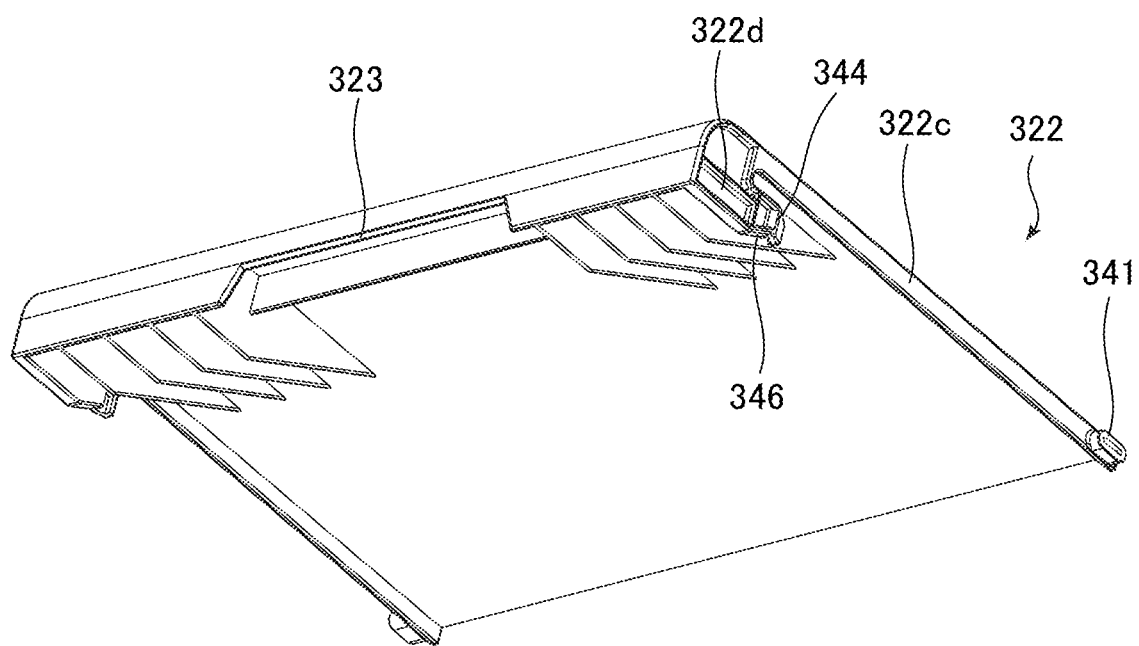
FIG. 11 is a perspective view of the sub-tray according to the first embodiment as viewed from below.

Next, the slide movement supporting portion 340 that slidably supports the sub-tray 322 will be described with reference to FIGS. 10 to 22. The slide movement supporting portion 340 includes a projection 341 serving as a first engagement portion, and a rail 342 serving as a second engagement portion and a guide portion. As illustrated in FIG. 11, the projections 341 are provided at both ends of the sub-tray 322 in the width direction. The width direction is orthogonal to a direction in which the document is fed by the document feeding portion 311 (direction from the apparatus front side to the apparatus rear side) and the vertical direction. The projection 341 is provided so as to protrude from the end in the width direction of the sub-tray 322 toward a portion of the casing 330 facing the end in the width direction. As illustrated in FIG. 10, the rail 342 is provided in the casing 330 of the image reading apparatus 300 and can be engaged with the projection 341. That is, the rail 342 serving as a guide portion is engaged with the projection 341 to slidably guide the sub-tray 322.

As described above, in the sub-tray 322, the second supporting surface 322a is inclined at the second position as compared with the state at the first position. Therefore, the slide movement supporting portion 340 includes a holding portion 343 that holds the sub-tray 322 in an inclined state at the second position.

Furthermore, in the present embodiment, the image reading apparatus 300 includes an abutting portion 344 and an abutted portion 345 as illustrated in FIGS. 11 to 14. The abutting portion 344 is provided on one of the casing 330 of the image reading apparatus 300 and the sub-tray 322. In the present embodiment, the abutting portion 344 is provided on the sub-tray 322. The abutted portion 345 is provided on the other of the casing 330 of the image reading apparatus 300 and the sub-tray 322, and abuts on the abutting portion 344 in a state where the sub-tray 322 is located at a predetermined position between the first position and the second position, and does not abut on the abutting portion 344 in a state where the sub-tray 322 is located closer to the second position than the predetermined position. In the present embodiment, the abutted portion 345 is provided in the casing 330. Note that the abutting portion 344 may be provided on the casing 330 side, and the abutted portion 345 may be provided on the sub-tray 322 side. Hereinafter, the configuration related to the sliding movement of the sub-tray 322 will be described in detail.

Configuration Related to Sub-tray

First, a configuration related to the sub-tray 322 in the slide movement configuration of the sub-tray 322 will be described with reference to FIGS. 11 and 12. As illustrated in FIG. 11, projections 341 are provided at ends on the apparatus rear side of the end faces 322c on both sides in the width direction of the sub-tray 322 so as to protrude outward in the width direction (side away from the end face 322c). The projection 341 has a shape elongated in the sliding direction of the sub-tray 322 when viewed from the width direction, and has an elliptical shape or a shape in which ends of a first semicircle convexly curved toward a first direction and ends of a second semicircle that is convexly curved toward a second direction opposite to the first direction are connected to each other via a pair of straight lines. The first and second semicircles are protruding outward each other.

Figure 12:
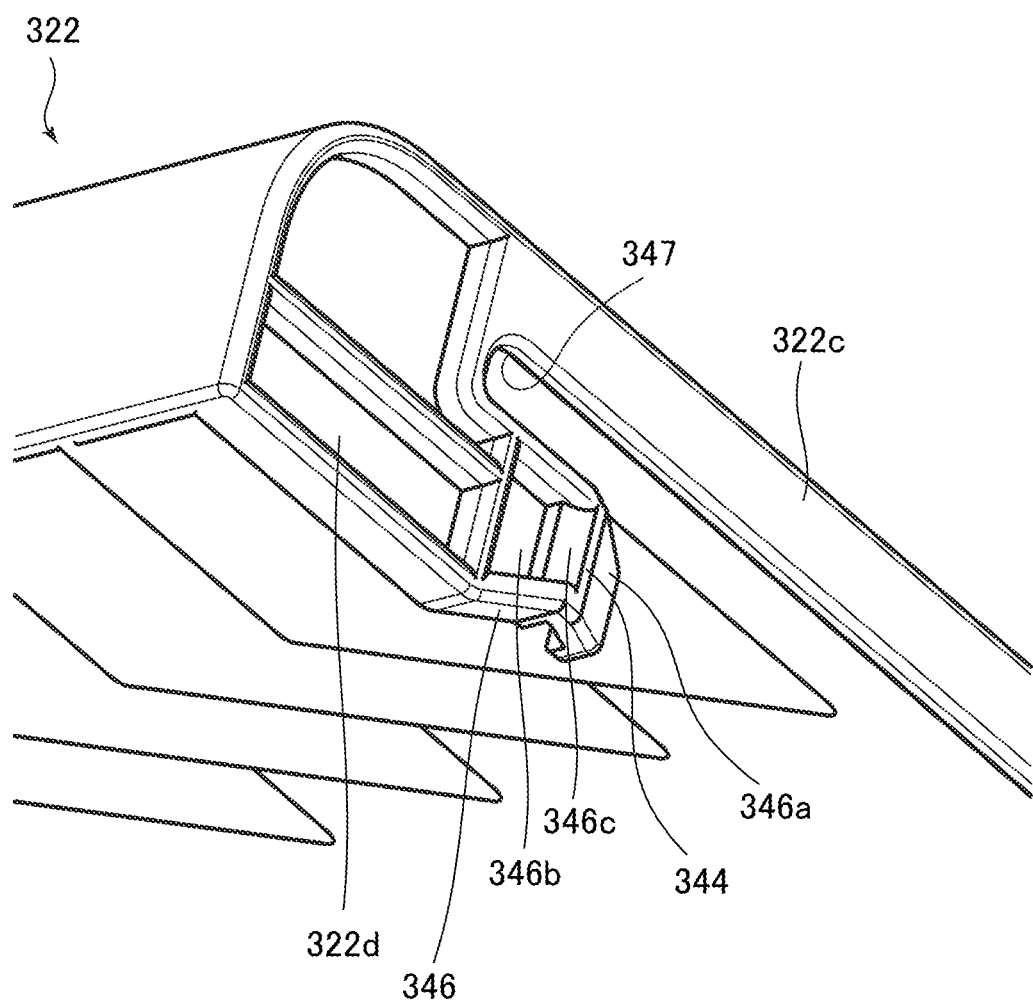
FIG. 12 is an enlarged perspective view illustrating a periphery of an abutting portion of the sub-tray according to the first embodiment.

As illustrated in FIGS. 11 and 12, a bent portion 322d formed to be bent downward from the end face 322c is provided at the end of the sub-tray 322 on the apparatus front side. An extension portion 346 formed to protrude toward the apparatus rear side is provided at an end of the bent portion 322d on the apparatus rear side. A recessed portion 347 is formed between the extension portion 346 and the end face 322c so as to enter the apparatus front side from the end face of the extension portion 346 on the apparatus rear side. Therefore, there is a gap between the extension portion 346 and the end face 322c.

The above-described abutting portion 344 is provided at an end of the extension portion 346 on the apparatus rear side. That is, the abutting portion 344 is provided so as to protrude outward in the width direction from a part of the extension portion 346. Of the outer surfaces of the extension portion 346 in the width direction, an inclined surface 346a that is inclined inward in the width direction toward the distal end is formed on the apparatus rear side (distal end side) with respect to the abutting portion 344, and a recess portion 346b that is recessed inward in the width direction is formed on the apparatus front side with respect to the abutting portion 344. An inclined surface 346c that is inclined inward in the width direction toward the apparatus front side is also formed between the abutting portion 344 and the recess portion 346b.

Configuration related to Casing Side of Image Reading Apparatus

Figure 13:
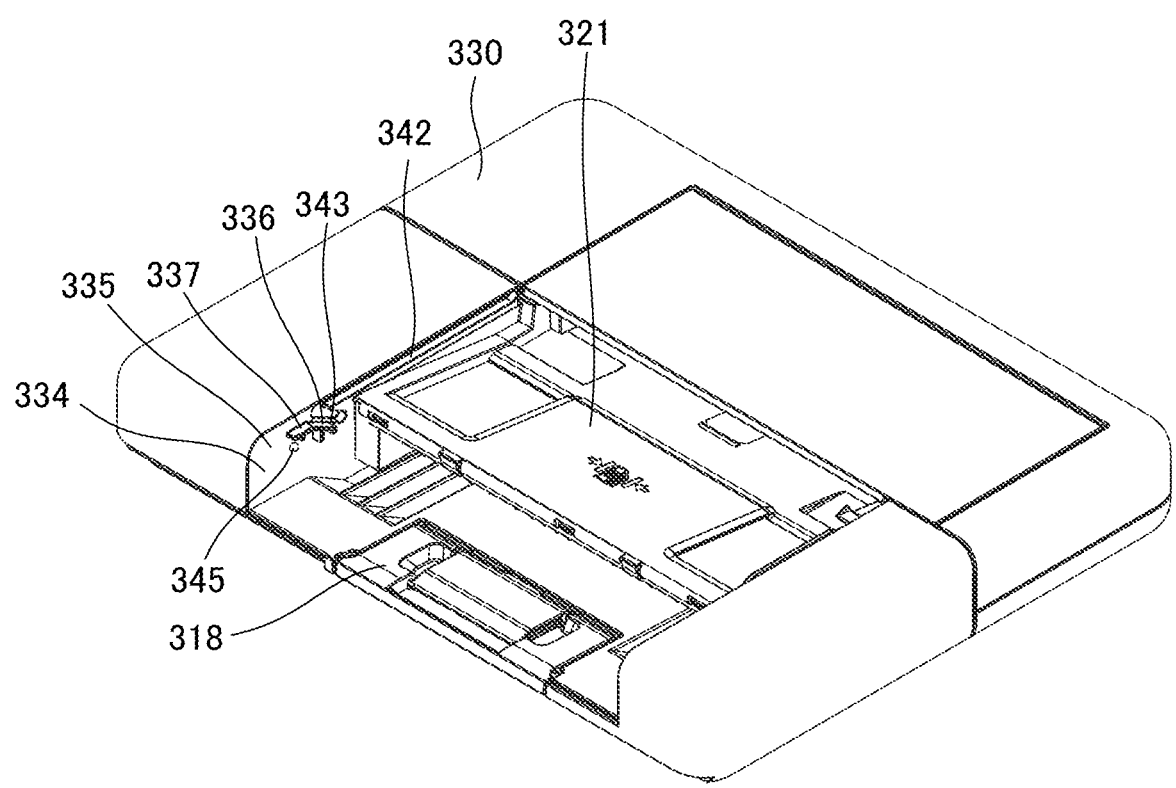
FIG. 13 is a perspective view of the ADF according to the first embodiment as viewed from above with a sub-tray removed.
Figure 14:
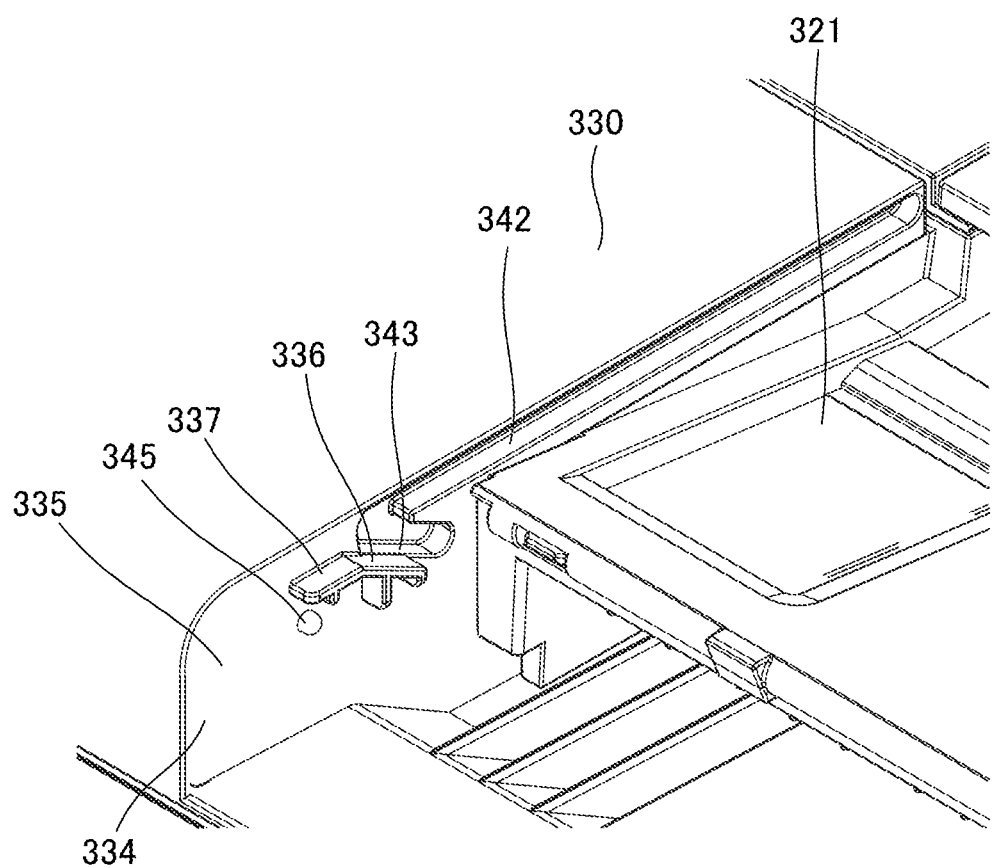
FIG. 14 is a perspective view illustrating details of a rail according to the first embodiment.

Next, a configuration related to the casing 330 side of the image reading apparatus 300 in the slide movement configuration of the sub-tray 322 will be described with reference to FIGS. 10, 13, and 14. As illustrated in FIGS. 10 and 13, the casing 330 has an opening portion 334 through which the sub-tray 322 can be inserted and drawn out. The opening portion 334 has side walls 335 in which both ends in the width direction of the sub-tray 322 at the first position face each other. The side walls 335 are provided at both ends in the width direction of the opening portion 334 along the front-rear direction. The side wall 335 is a wall surface perpendicular to the document discharge tray 319 and substantially parallel to the vertical direction.

A rail 342 is formed along the front-rear direction in an upper portion of the main body tray 321 in the side wall 335. The rail 342 is a recess portion formed so as to be recessed from the wall surface of the side wall 335, and has a width in the vertical direction slightly larger than a width in the vertical direction (length in the lateral direction) of the projection 341. The rail 342 is engaged with the projection 341 and guides the projection 341 in the front-rear direction when the projection 341 provided on the sub-tray 322 enters the inside.

A holding portion 343 is formed at an end of the rail 342 on the apparatus front side of the side wall 335 so as to be continuous with the rail 342. The holding portion 343 is a recess portion formed so as to be recessed from the wall surface of the side wall 335 similarly to the rail 342, and is inclined with respect to the rail 342. Specifically, as illustrated in FIG. 14, the holding portion 343 is formed to be bent downward from the end of the rail 342 on the apparatus front side and to be inclined toward the apparatus rear side toward the lower side. The holding portion 343 is provided on the apparatus front side with respect to the main body tray 321.

As will be described in detail later, the holding portion 343 is formed such that the projection 341 can enter by moving the projection 341 of the sub-tray 322 to the end on the apparatus front side of the rail 342 and then being lifted the end on the apparatus front side of the sub-tray 322. Then, by pushing down the sub-tray 322 along the inclination of the holding portion 343, the projection 341 enters the holding portion 343. Since the projection 341 has a shape elongated in the front-rear direction as described above, the side surface of the projection 341 is engaged with the inner wall surface of the holding portion 343, whereby the sub-tray 322 is held in the direction along the inclination direction of the holding portion 343.

Note that the rail 342 and the holding portion 343 may have a configuration of a separate member fixed to the side wall 335, for example, in addition to the recess portion formed in the side wall 335 as described above. Further, a configuration of the rail 342 and the holding portion 343 may be provided so as to protrude from the side wall 335 so as to sandwich the projection 341 from both sides in the short direction. Further, the projection 341 may have, for example, a cylindrical shape or a roller rotatably provided. In this case, a plurality of projections 341 are provided in the front-rear direction of the sub-tray 322. For example, one projection 341 is provided at each of both ends in the front-rear direction on one side in the width direction of the sub-tray 322, and a total of four projections 341 are provided on both sides in the width direction.

Further, an inclined supporting portion 336 is provided below the holding portion 343 of the side wall 335 so as to protrude inward in the width direction. The inclined supporting portion 336 is inclined along the inclination of the holding portion 343, and supports the lower surface of the sub-tray 322 of which the projection 341 is held by the holding portion 343. As a result, the sub-tray 322 is more reliably held in the inclined state at the second position. Note that the inclined supporting portion 336 may be omitted as long as the sub-tray 322 can be sufficiently held by the engagement between the projection 341 and the holding portion 343.

The auxiliary supporting portion 337 is provided on the apparatus front side of the inclined supporting portion 336 of the side wall 335 so as to protrude inward in the width direction. The auxiliary supporting portion 337 is provided substantially parallel to the front-rear direction, and supports the lower surface of the portion of the sub-tray 322 on the apparatus front side with respect to the rail 342 in a state where the projection 341 is guided by the rail 342 to assist the sliding movement of the sub-tray 322. The end of the auxiliary supporting portion 337 on the apparatus rear side is smoothly continuous with the end of the inclined supporting portion 336 on the apparatus front side, and does not interfere with the sub-tray 322 when the sub-tray 322 is inclined by the engagement between the projection 341 and the holding portion 343.

The abutted portion 345 is provided below the auxiliary supporting portion 337 in the side wall 335. The abutted portion 345 is provided so as to protrude inward in the width direction from the side wall 335 and to be movable in the width direction with respect to the side wall 335. The abutted portion 345 is urged inward in the width direction by an urging spring 349 (FIGS. 20 to 22) serving as an urging member.

The abutted portion 345 is provided at a position aligned with the extension portion 346 in a state where the sub-tray 322 is at the first position. Then, by the abutting portion 344 provided on the extension portion 346 abutting on the abutted portion 345, a click feeling (response) is given to the operator at the time of the operation of pushing the sub-tray 322 to the first position. In addition, the abutted portion 345 enters the recess portion 346b provided in the extension portion 346, whereby the sub-tray 322 is locked at the first position. That is, the abutted portion 345 and the recess portion 346b serve as a locking portion 348 (FIG. 22) capable of locking the sub-tray 322 to the first position. An operation related to this point will be described later.

Sliding Operation of Sub-tray

Figure 15:
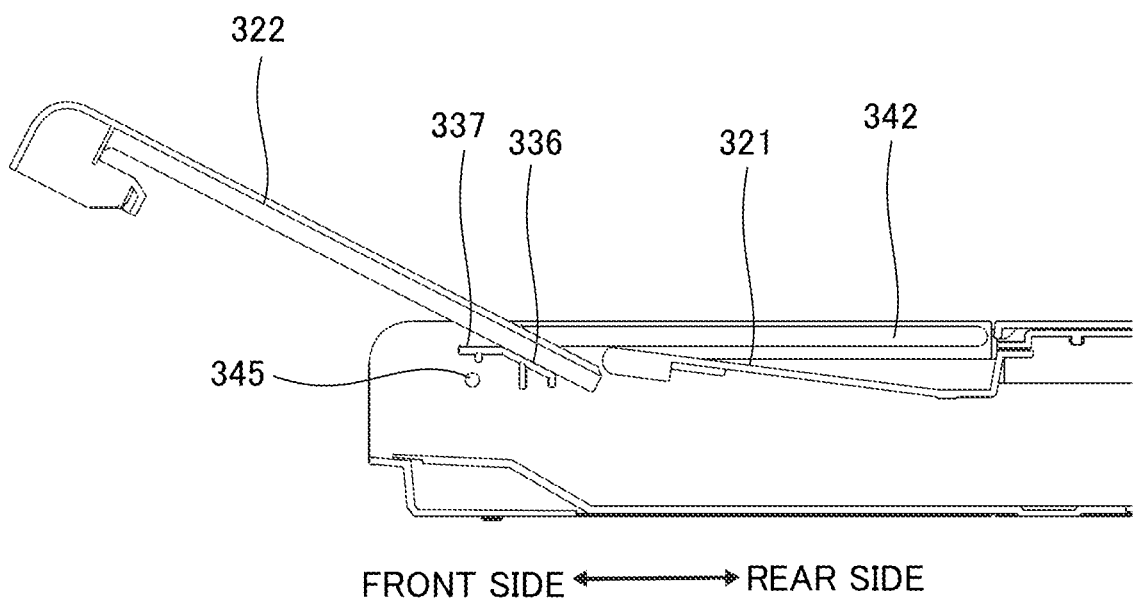
FIG. 15 is a partial cross-sectional view of the ADF illustrating a state in which the sub-tray according to the first embodiment is at a second position.
Figure 16:
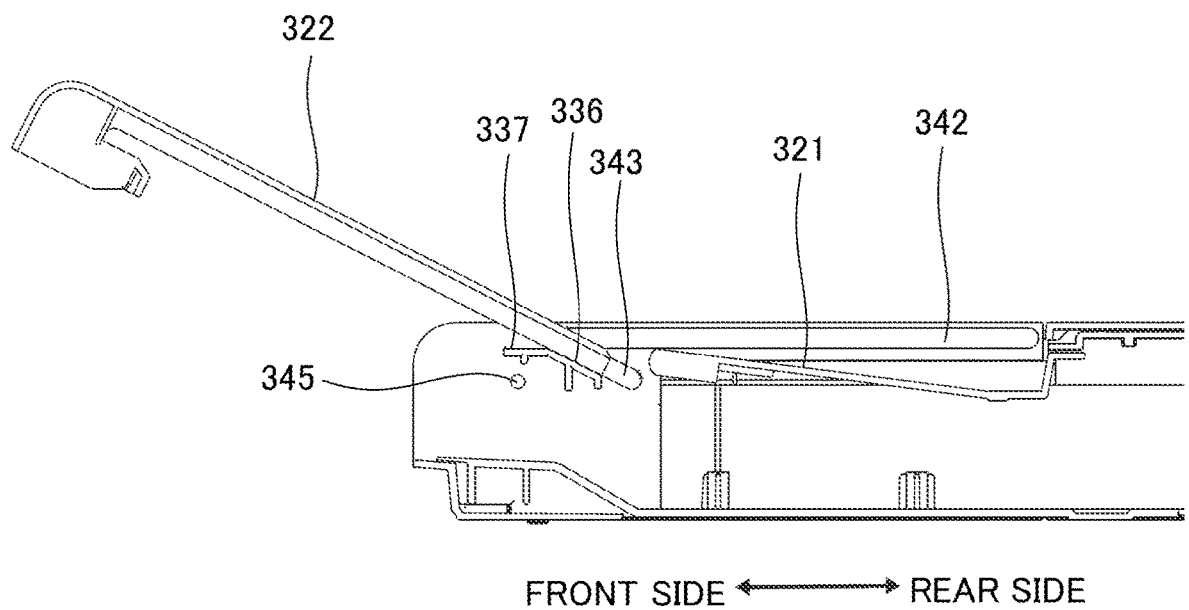
FIG. 16 is a partial cross-sectional view of the ADF illustrating a state in which the sub-tray according to the first embodiment is drawn out from the second position.

Next, an operation of sliding the sub-tray 322 from the second position toward the first position will be described with reference to FIGS. 15 to 19. FIG. 15 illustrates a state in which the sub-tray 322 is at the second position. At the second position, the projection 341 of the sub-tray 322 is engaged with the holding portion 343, and the lower surface of the sub-tray 322 is supported by the inclined supporting portion 336. When returning the sub-tray 322 to the first position, first, as illustrated in FIG. 16, the sub-tray 322 is pulled up toward the apparatus front side and upward, that is, obliquely upward. Then, the projection 341 comes out of the holding portion 343, and the sub-tray 322 can be pivoted in a direction in which the apparatus front side is lowered.

Figure 17:
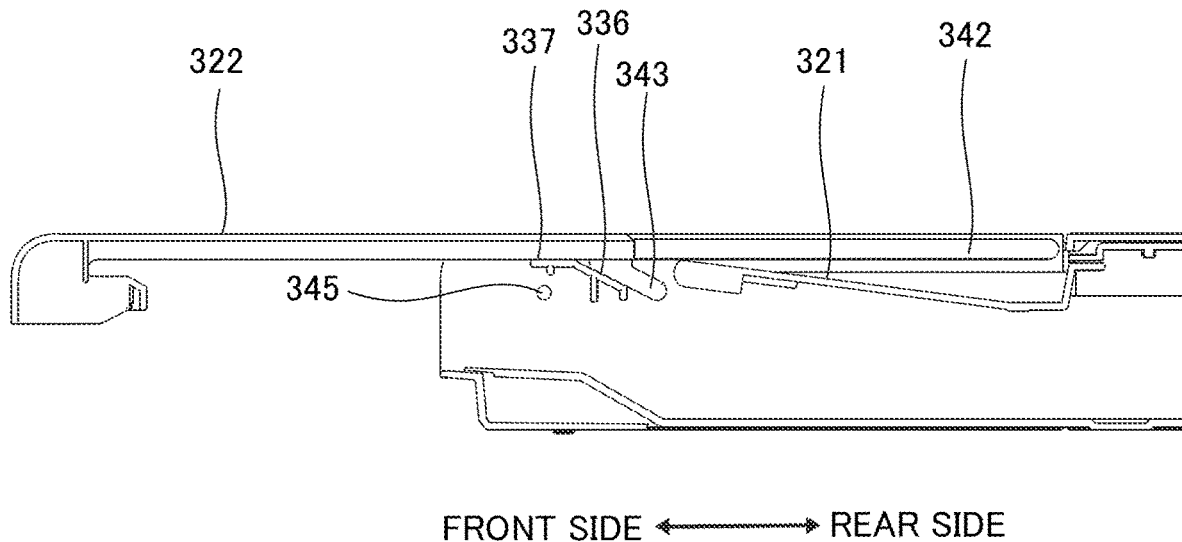
FIG. 17 is a partial cross-sectional view of the ADF illustrating a state in which the sub-tray according to the first embodiment is drawn out from the second position and tilted.
Figure 18:
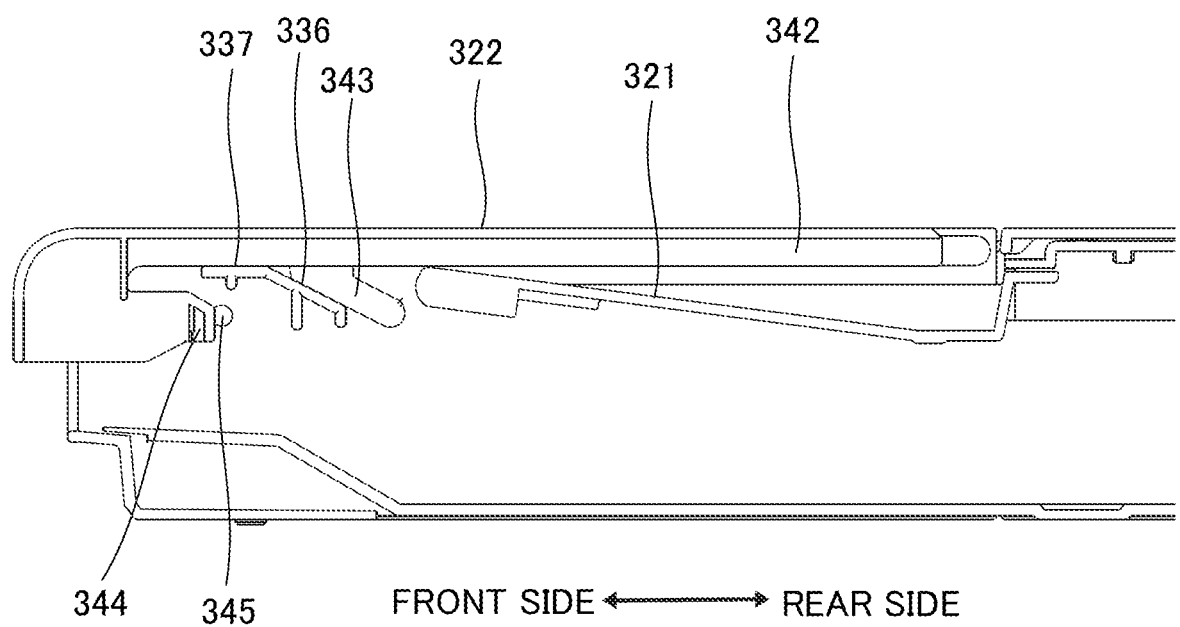
FIG. 18 is a partial cross-sectional view of the ADF illustrating a state in which the sub-tray according to the first embodiment is pushed toward a first position.

Next, as illustrated in FIG. 17, the sub-tray 322 is inclined in a direction along the rail 342, in the present embodiment, in a substantially horizontal direction. When the sub-tray 322 is pushed into the apparatus rear side in this state, the sub-tray 322 is guided to the apparatus rear side along the rail 342 by the engagement between the projection 341 and the rail 342 as illustrated in FIG. 18. At this position, the abutting portion 344 of the sub-tray 322 does not abut on the abutted portion 345 on the casing 330 side.

Figure 19:
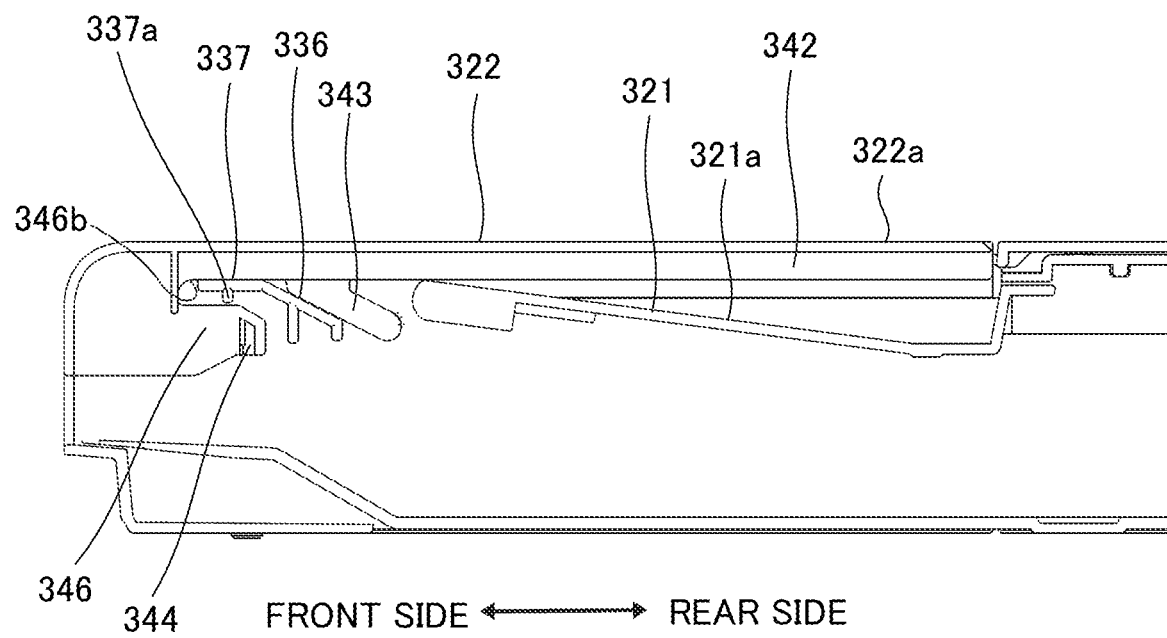
FIG. 19 is a partial cross-sectional view of the ADF illustrating a state in which the sub-tray according to the first embodiment is at a first position.

Further, when the sub-tray 322 is pushed from this position, as will be described later, the abutting portion 344 abuts on the abutted portion 345 to give a click feeling to the operator, and when further pushed, the abutted portion 345 enters the recess portion 346b, and the sub-tray 322 is locked at the first position as illustrated in FIG. 19. In this state, the sub-tray 322 is mounted at the first position. In this state, the auxiliary supporting portion 337 enters the recessed portion 347. A projection 337a protruding downward is provided on the lower surface of the auxiliary supporting portion 337, and the projection 337a abuts on the upper surface of the extension portion 346 of the sub-tray 322 or approaches the upper surface of the extension portion 346 through a slight gap in a state where the auxiliary supporting portion 337 enters the recessed portion 347. Such a projection 337a abuts on the upper surface of the extension portion 346 in a state where the sub-tray 322 is located at the first position, thereby restricting the sub-tray 322 from being lifted upward independently from the pressure plate 303. As a result, when the operator grips and lifts the gripping portion 323 upward, the pressure plate 303 and the ADF 310 are lifted upward together with the sub-tray 322.

When the sub-tray 322 is drawn out from the first position to the second position, the operation opposite to the above is performed. That is, when the sub-tray 322 is pulled toward the apparatus front side by gripping the gripping portion 323 from the state of FIG. 19, the abutting portion 344 gets over the abutted portion 345 and enters the state illustrated in FIG. 18. This operation also gives a click feeling to the operator. Next, the sub-tray 322 is drawn out to the apparatus front side to be in the state of FIG. 17. In the state of FIG. 17, the projection 341 comes out from the end of the rail 342 on the apparatus front side, and the sub-tray 322 is pivotable in a direction in which the apparatus front side is lifted.

Next, the sub-tray 322 is inclined by lifting the apparatus front side, and the state of FIG. 16 is obtained. The state of FIG. 16 is a state in which the projection 341 can enter the holding portion 343. Then, by pushing down the sub-tray 322 toward the apparatus rear side and downward, that is, obliquely downward to cause the projection 341 to enter the holding portion 343, the state of the second position as illustrated in FIG. 15 is obtained.

Operation of Pushing Sub-Tray Toward First Position

Figure 20:
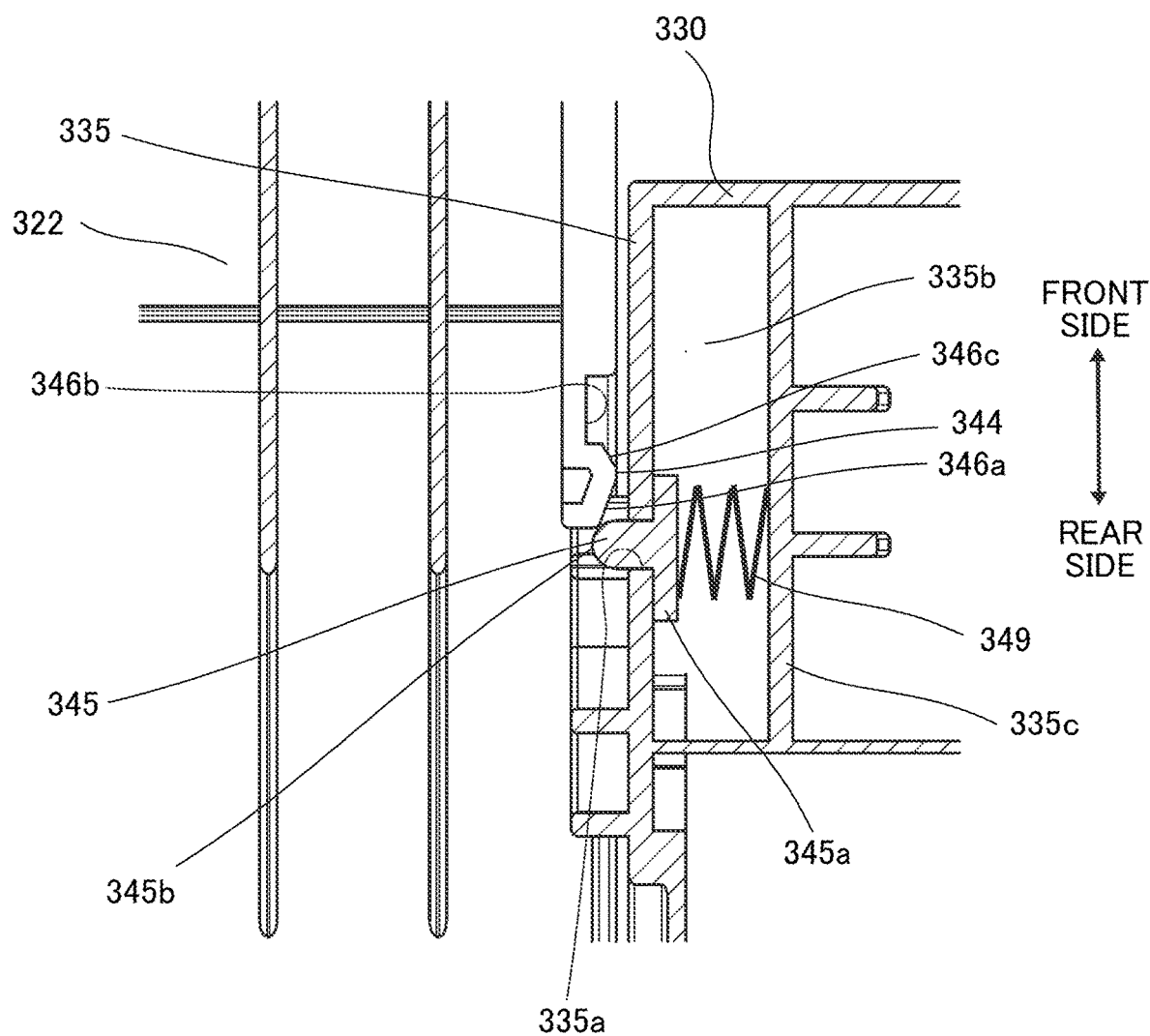
FIG. 20 is a cross-sectional view illustrating a relationship between the abutting portion and the abutted portion immediately before the sub-tray according to the first embodiment is pushed toward the first position.
Figure 21:
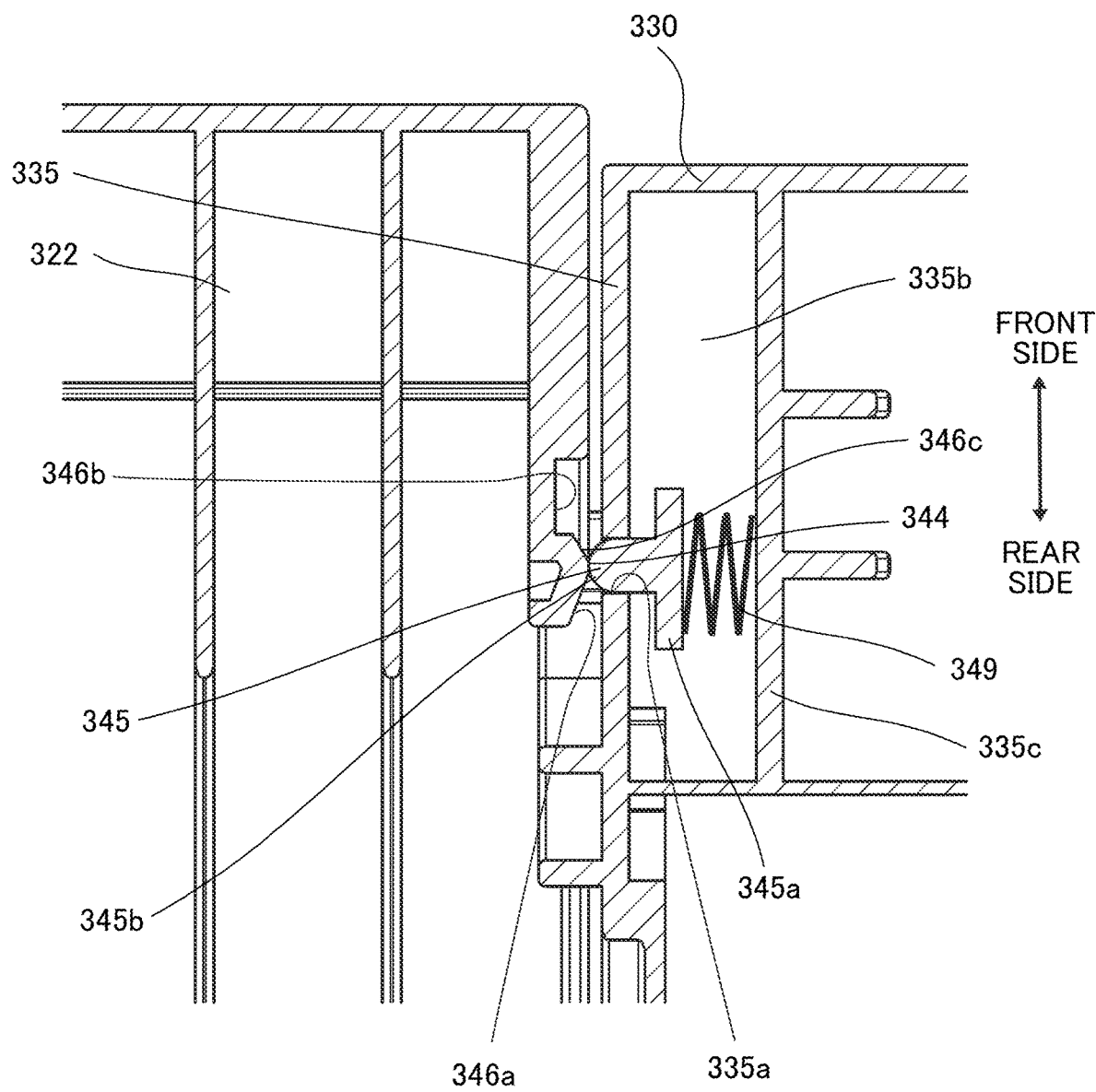
FIG. 21 is a cross-sectional view illustrating a state in which the abutting portion and the abutted portion abut on each other when the sub-tray according to the first embodiment is pushed toward the first position.

Next, the relationship between the periphery of the abutting portion 344 and the abutted portion 345 at the time of the pushing operation of the sub-tray 322 described above with reference to FIGS. 18 to 19 to the first position on the apparatus rear side will be described with reference to FIGS. 20 to 22. FIG. 20 illustrates the state of FIG. 18 described above. In this state, the distal end of the inclined surface 346a on the distal end side (apparatus rear side) of the abutting portion 344 abuts on the abutted portion 345.

The abutted portion 345 includes a base portion 345a and a projection 345b protruding from the base portion 345a, and is disposed such that the projection 345b protrudes from a through-hole 335a formed in the side wall 335 of the casing 330. The base portion 345a is disposed in the internal space 335b on the outer side in the width direction of the side wall 335. An inner wall 335c is provided in the internal space 335b of the casing 330, and an urging spring 349 is disposed between the inner wall 335c and the base portion 345a.

The abutted portion 345 is urged inward in the width direction, that is, in a direction in which the projection 345b protrudes from the through-hole 335a by the urging spring 349. At this time, the projection amount of the projection 345b is restricted by the base portion 345a abutting on the side wall 335. When the abutted portion 345 is pushed outward in the width direction, the abutted portion 345 is movable outward in the width direction against the urging force of the urging spring 349. The state of FIG. 20 is a state in which the base portion 345a abuts on the side wall 335.

When the sub-tray 322 is pushed toward the apparatus rear side from this state, the projection 345b of the abutted portion 345 abuts on the inclined surface 346a, and is pushed outward in the width direction along the inclination of the inclined surface 346a. Then, as illustrated in FIG. 21, the abutting portion 344 and the abutted portion 345 abut on each other. This position is a predetermined position between the first position and the second position. In this state, the abutted portion 345 is pressed against the urging force of the urging spring 349. Therefore, when the abutting portion 344 passes through the abutted portion 345, the resistance of the operation of pushing the sub-tray 322 toward the apparatus rear side increases.

That is, the abutted portion 345 does not abut on the abutting portion 344 in a state where the sub-tray 322 is located closer to the second position than the predetermined position, and abuts on the abutting portion 344 in a state where the sub-tray 322 is located at the predetermined position. Therefore, when the sub-tray 322 passes through the predetermined position, the resistance to move the sub-tray 322 increases. In the present embodiment, such a change in resistance gives a click feeling to the operator.

Next, when the sub-tray 322 is further pushed toward the apparatus rear side, the projection 345b of the abutted portion 345 gets over the abutting portion 344 and moves along the inclined surface 346c by the urging force of the urging spring 349. Then, as illustrated in FIG. 22, the projection 345b of the abutted portion 345 enters the recess portion 346b. In this state, the sub-tray 322 is locked at the first position. In this state, the abutted portion 345 does not abut on the abutting portion 344, and the projection 345b of the abutted portion 345 protrudes more inward in the width direction than when it is at a predetermined position.

Figure 22:
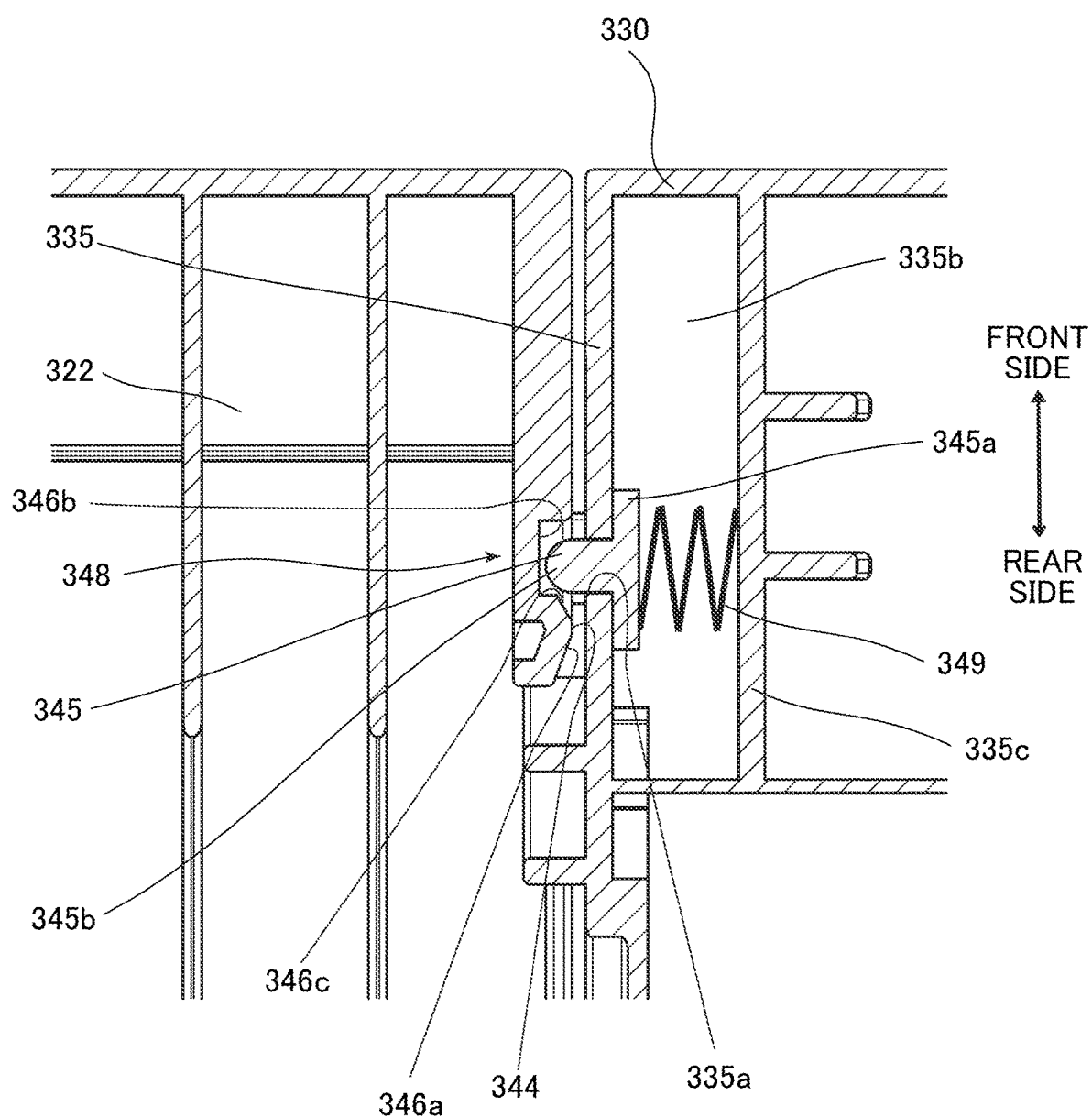
FIG. 22 is a cross-sectional view illustrating a state in which the sub-tray according to the first embodiment is pushed toward the first position and the abutted portion is locked to the recess portion.

On the other hand, when the sub-tray 322 is drawn out from the first position to the second position, the sub-tray 322 is pulled toward the apparatus front side from the state of FIG. 22. At this time, the inclined surface 346c on the apparatus rear side of the recess portion 346b abuts on the projection 345b of the abutted portion 345, so that the abutted portion 345 moves outward in the width direction against the urging force of the urging spring 349. Then, as illustrated in FIG. 21, the projection 345b of the abutted portion 345 abuts on the abutting portion 344, and the sub-tray 322 is further drawn out, so that the projection 345b of the abutted portion 345 gets over the abutting portion 344 and enters the state illustrated in FIG. 20. Since this position is a position corresponding to FIG. 18 described above, the sub-tray 322 is drawn out to the second position as described above with reference to FIGS. 17 to 15.

In the present embodiment, even when the sub-tray 322 is drawn out from the first position, the projection 345b of the abutted portion 345 gets over the abutting portion 344, so that a click feeling can be given to the operator as in the case of pushing the sub-tray 322 to the first position. By providing the operator with a click feeling when the sub-tray 322 is attached to the first position and drawn out from the first position in this manner, it is easy to determine that the operator has performed the attaching operation and the draw-out operation without any problem.

In addition, since the projection 345b of the abutted portion 345 is locked to the recess portion 346b in a state where the sub-tray 322 is at the first position, it is possible to suppress the sub-tray 322 from being unintentionally drawn out from the first position. Therefore, for example, when the operator grips the gripping portion 323 and lifts the pressure plate 303, it is also possible to suppress the sub-tray 322 from being inadvertently drawn out. Therefore, when the gripping portion for performing the operation of drawing the sub-tray 322 and the gripping portion for performing the operation of opening portion the pressure plate 303 are also used, the operability for opening the pressure plate 303 can be improved. The abutting portion 344, the abutted portion 345, and the urging spring 349 in the present embodiment are urging portions that apply an urging force (resistance force) in a direction opposite to the moving direction to the sub-tray 322 when the sub-tray 322 moves from the first position to the second position.

Configuration Related to Platen

Next, a configuration related to the platen 332 including the platen glass 302, the first positioning portion 305, and the second abutment portion 306 will be described with reference to FIGS. 23 to 26B. The platen 332 is provided so as to cover the upper side of the configuration for driving the reading unit 301 and the reading unit 301 of the image reading apparatus 300, and is provided with a platen glass 302, a reading glass 333, and the like. As described above, in the present embodiment, the carriage motor 353, the speed reducer 353b, and the drive pulley 355a for driving the reading unit 301 are collectively arranged in the space on the left side in the width direction with respect to the document placing surface 302a (see FIG. 6). In other words, the platen glass 302 and the reading glass 333 are shifted to the right side in the width direction from the apparatus center of the image reading apparatus 300, and a space in which the carriage motor 353 and the like are arranged is provided on the left side of the image reading apparatus 300.

Figure 24:
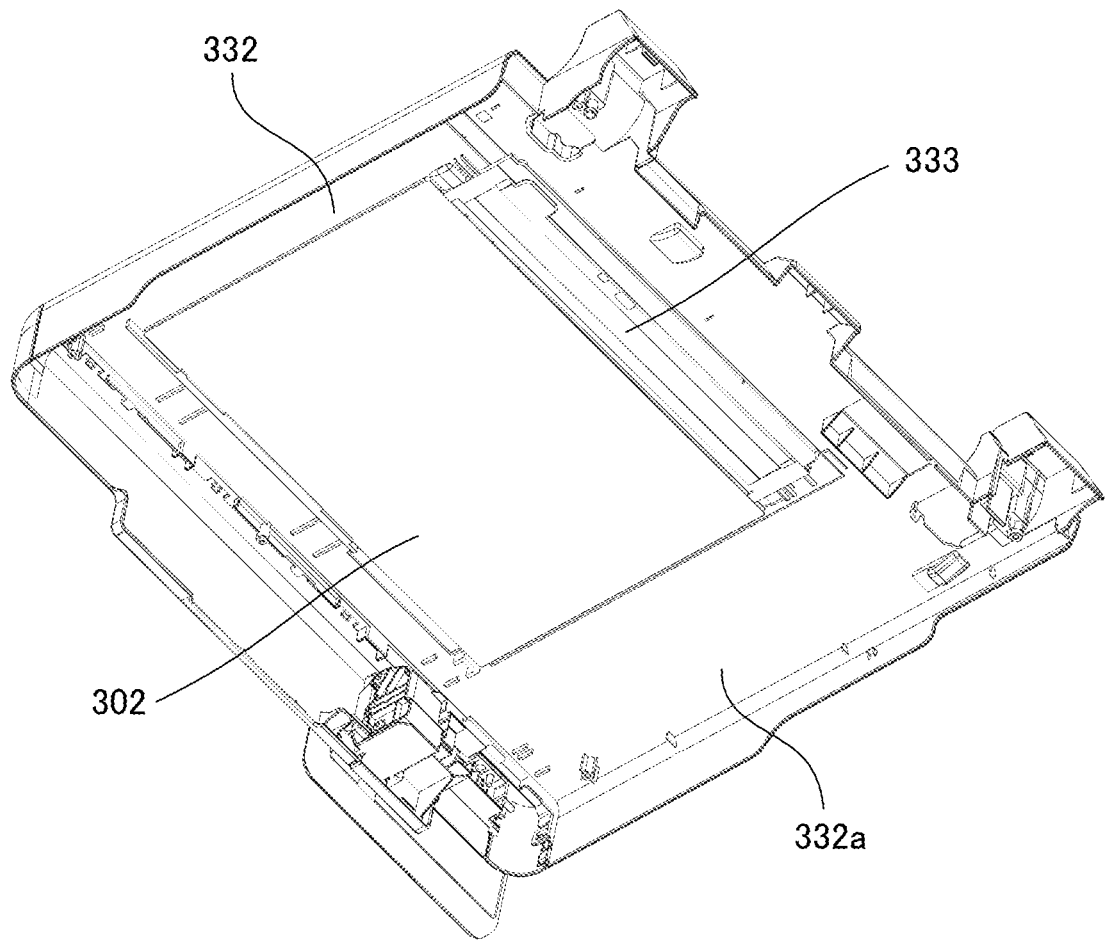
FIG. 24 is a perspective view of the platen according to the first embodiment as viewed from below.

Therefore, as illustrated in FIG. 24, a storage portion 332a that stores the carriage motor 353, the speed reducer 353b, and the drive pulley 355a is provided on the back side of the platen 332, and the platen glass 302 and the reading glass 333 are provided on the right side in the width direction (the upper left side in FIG. 24) of the storage portion 332a. The conveyance center N1 of the ADF 310 described above is shifted in the width direction with respect to the apparatus center N2 in accordance with the position of the reading glass 333 in the width direction (see FIG. 9).

Next, an abutment portion against which a document placed on the document placing surface 302a of the platen glass 302 is abutted will be described. As described above, as illustrated in FIG. 23, the first abutment portion 305 and the second abutment portion 306 against which the edge portion of the document placed on the document placing surface 302a abuts are provided at the end of the platen glass 302 in order to position the document at the reference position for reading by the reading unit 301.

The first abutment portion 305 is provided at a front end on a side far from the hinge 304, of a pair of ends of the document placing surface 302a in a direction (front-rear direction) orthogonal to the pivot shaft of the hinge 304 (FIG. 3). In the present embodiment, the hinge 304 is on the apparatus rear side of the document placing surface 302a, and the first abutment portion 305 is at an end on the apparatus front side of the document placing surface 302a.

The first abutment portion 305 is provided at an end of the document placing surface 302a on the apparatus front side in substantially parallel to the width direction. Then, among the edge portions of the document placed on the document placing surface 302a, a first edge portion on the apparatus front side abuts against the first abutment portion 305. The first edge portion of the document abuts the first abutment portion 305 to perform positioning in the front-rear direction of the document.

The second abutment portion 306 is provided at one of a pair of ends of the document placing surface 302a in a direction (width direction) parallel to the pivot shaft of the hinge 304. In the present embodiment, the second abutment portion 306 is provided at the left end of the document placing surface 302a. Then, among the edge portions of the document placed on the document placing surface 302a, a second edge portion in the direction orthogonal to the first edge portion abuts against the second abutment portion 306. In the present embodiment, the second edge portion is an edge portion on the left side of the document placed on the document placing surface 302a. The second edge portion of the document abuts against the second abutment portion 306 to perform positioning in the width direction (left-right direction) of the document.

Figure 23:
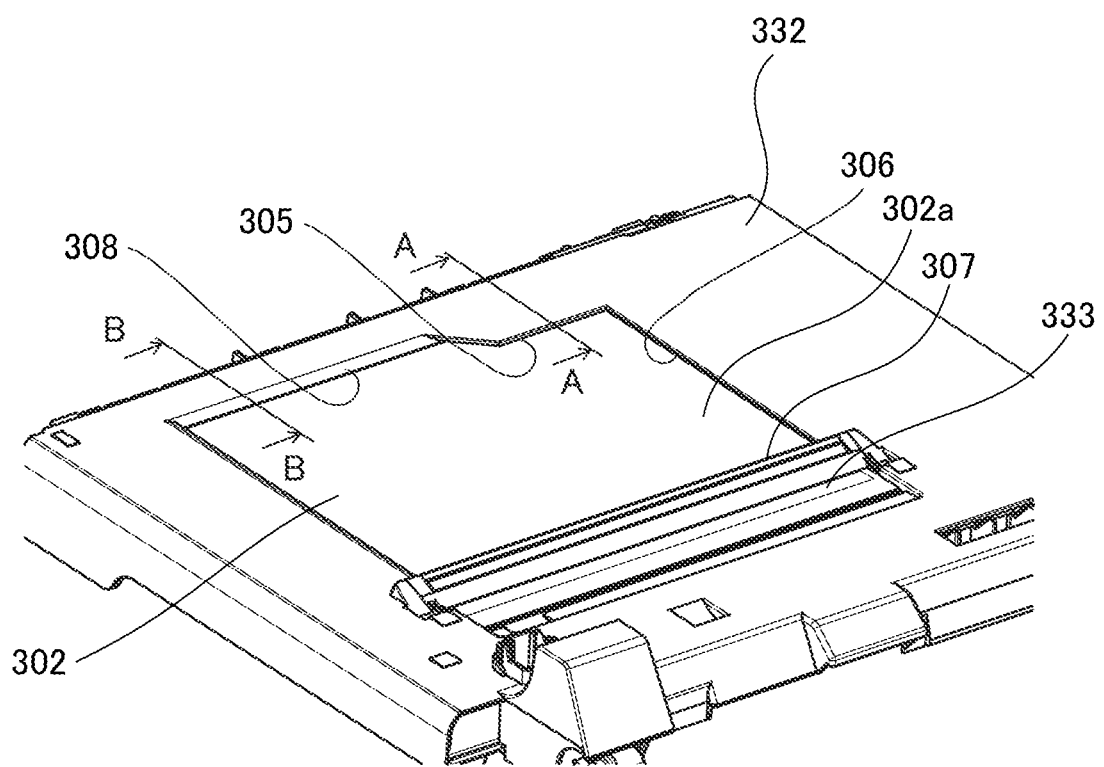
FIG. 23 is a perspective view illustrating a document placing surface of a platen glass according to the first embodiment.
Figure 25:
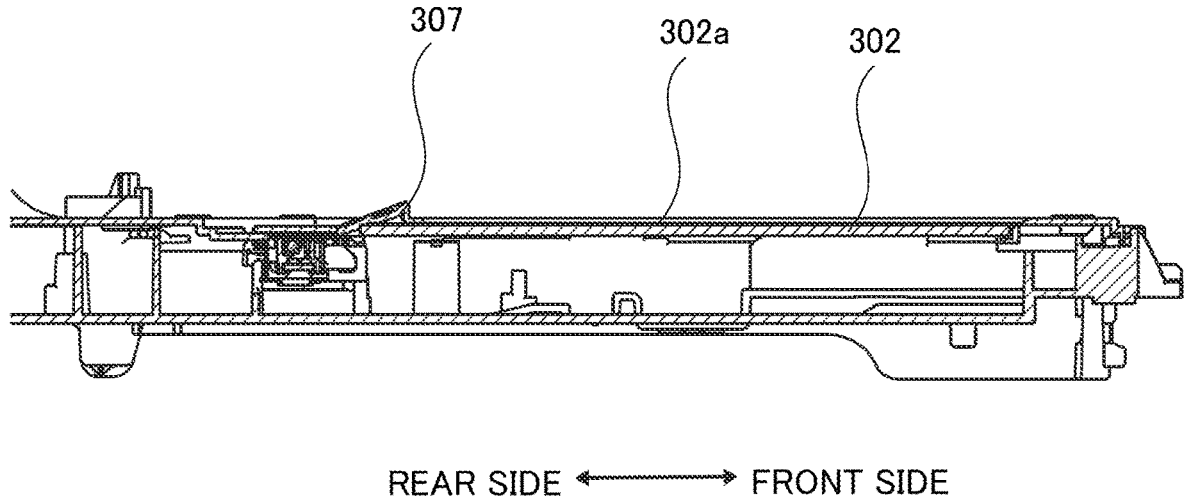
FIG. 25 is a cross-sectional view around a document placing surface of the image reading apparatus according to the first embodiment.

As illustrated in FIGS. 23 and 25, a document regulating portion 307 is provided over the width direction on the apparatus rear side of the document placing surface 302a. The document regulating portion 307 is a wall protruding upward from the document placing surface 302a in order to regulate the position on the rear side of the document placed on the document placing surface 302a, and indicates that the image is read in the fixed-reading mode on the apparatus front side from this position. As described above, the reading glass 333 on which the reading unit 301 is located when the feeding-reading mode is performed is provided on the apparatus rear side of the document regulating portion 307.

In the present embodiment, the maximum size of the document that can be placed on the document placing surface 302a and an image can be read is A5 size. This is because a document (for example, an A4 size) having a size larger than the A5 size can be conveyed by the ADF 310 and an image can be read in the feeding-reading mode. The fixed-reading mode is intended for documents of A5 size or smaller, and is particularly suitable for reading an image by placing a card size such as a business card or a license card, which is difficult to convey by the ADF 310, on the document placing surface 302a.

As described above, the first positioning portion 305 for positioning the document in the front-rear direction is provided on the apparatus front side, but the apparatus front side is also a side on which the operator mounts the document on the document placing surface 302a or takes out the document from the document placing surface 302a. Therefore, when the first positioning portion 305 is provided in the entire width direction area of the end of the document placing surface 302a on the apparatus front side, there is a possibility that it becomes difficult for the operator to take out the document from the document placing surface 302a.

Therefore, in the present embodiment, as illustrated in FIG. 23, a part of the end of the document placing surface 302a on the apparatus front side is the first abutment portion 305, and the other portion is the inclined surface 308 on which the document is slid from the document placing surface 302a to the apparatus front side so as to be easily taken out. That is, the first abutment portion 305 is provided partially in the direction (width direction) parallel to the pivot shaft of the hinge 304 at the end on the side far from the hinge 304, that is, the end on the apparatus front side, of the pair of ends of the document placing surface 302a. On the other hand, the inclined surface 308 is provided at the other portion in the width direction at the end of the document placing surface 302a on the apparatus front side. Further, the inclined surface 308 is inclined upward toward the side farther from the hinge 304, that is, toward the apparatus front side. The inclined surface 308 is disposed closer to the front side than the first abutment portion 305 in the front-rear direction. Note that the shape of the inclined surface 308 is not limited to a flat surface, and may be a curved surface that becomes higher toward the apparatus front side.

Specifically, the first positioning portion 305 is provided in a portion from the left side of the center in the width direction to the left end of the document placing surface 302a in the end of the document placing surface 302a on the apparatus front side. On the other hand, the inclined surface 308 is provided in a portion from the right side of the first positioning portion 305 to the right end of the document placing surface 302a. As described above, the left end of the document placing surface 302a is the second abutment portion 306. Therefore, the document is positioned in the front-rear direction and the left-right direction by abutting the document against the corner formed by the end on the apparatus front side of the document placing surface 302a and the end on the left side of the apparatus.

On the other hand, when the document is taken out from the document placing surface 302a, the document positioned by the first positioning portion 305 and the second abutment portion 306 is shifted to the right side and slid from the portion of the inclined surface 308 to the apparatus front side. As a result, the document can be smoothly taken out without interfering with the first positioning portion 305.

Here, the relationship in length in the width direction between the first positioning portion 305 and the second abutment portion 306 can be appropriately set, but in the present embodiment, the first positioning portion 305 is shorter than the second abutment portion 306. This is because, in the fixed-reading mode, a document having a small size is targeted, and positioning in the front-rear direction can be sufficiently performed even if the length of the first positioning portion 305 is short. On the other hand, by increasing the length of the second abutment portion 306, for example, the document can be easily taken out from the document placing surface 302a without greatly opening portion the pressure plate 303.

Figure 26A:
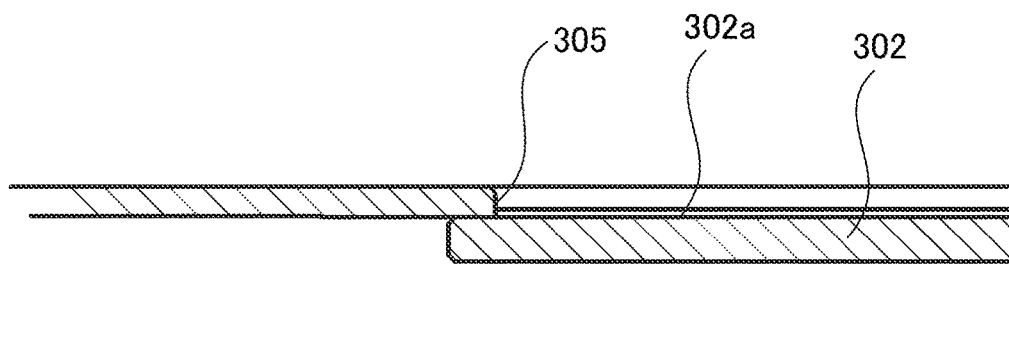
FIG. 26A is a cross-sectional view taken along line A-A of FIG. 23.

The first positioning portion 305 and the inclined surface 308 will be described in more detail with reference to FIGS. 26A and 26B. FIG. 26A is a cross-sectional view of the first positioning portion 305. The first positioning portion 305 is a wall rising substantially perpendicularly to the document placing surface 302a of the platen glass 302, and can abut a first edge portion of the document. The second abutment portion 306 also has the same configuration as the first abutment portion 305.

Figure 26B:
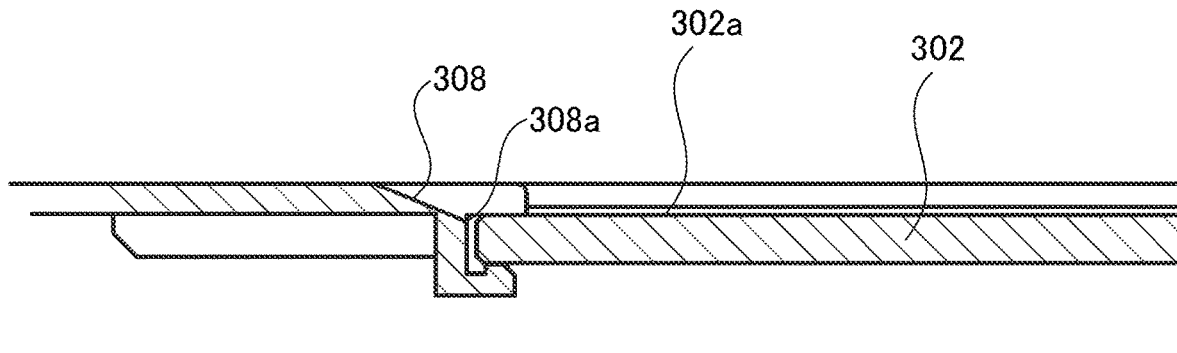
FIG. 26B is a cross-sectional view taken along line B-B of FIG. 23.

FIG. 26B is a cross-sectional view of the inclined surface 308. As described above, the inclined surface 308 is inclined upward toward the apparatus front side (the left side in FIG. 26B). The lowermost end 308a of the inclined surface 308 is positioned below the document placing surface 302a. In other words, the document placing surface 302a, which is the surface of the platen glass 302, is located above the lowermost end 308a of the inclined surface 308. Accordingly, the document placed on the document placing surface 302a can be easily taken out via the inclined surface 308.

That is, in a case where the lowermost end 308a of the inclined surface 308 is above the document placing surface 302a, a step surface is generated between the document placing surface 302a and the inclined surface 308, and there is a possibility that the document abuts on the step surface when the document is slid toward the inclined surface 308 and taken out. Furthermore, in a case where the lowermost end 308a of the inclined surface 308 is located at the same height position as the document placing surface 302a, there is a possibility that the lowermost end 308a is located slightly above the document placing surface 302a due to a manufacturing error or the like, and in this case, the above-described step surface also occurs. If the document abuts against the stepped surface when the document is taken out from the document placing surface 302a, it becomes difficult to slide and take out the document from the document placing surface 302a even though the inclined surface 308 is provided. Therefore, in the present embodiment, the lowermost end 308a of the inclined surface 308 is positioned below the document placing surface 302a.

As described above, in the present embodiment, since the first abutment portion 305 is provided at the end of the document placing surface 302a on the apparatus front side, it is easy to perform the work of placing the document on the document placing surface 302a from the apparatus front side and performing positioning in the front-rear direction. In particular, even in a case where the space above the image reading apparatus 300 is narrow and the pressure plate 303 does not open largely, it is sufficient to butt the document against the first abutment portion 305 on the apparatus front side, so that the document can be easily positioned and placed on the document placing surface 302a.

In addition, since the inclined surface 308 is provided at the end of the document placing surface 302a on the apparatus front side adjacent to the first abutment portion 305, it is easy to take out the document from the document placing surface 302a. In particular, it is easy to take out the document even if the pressure plate 303 is not largely opened. For example, it is possible to take out the document while sliding the document toward the apparatus front side via the inclined surface 308 while shifting the document in the width direction to the area where the inclined surface 308 is located.

The image forming apparatus 100 of the present embodiment having the above-described configuration has good operability even when installed in a narrow space such as under a shelf or a desk. That is, in the present embodiment, since the main functions of the image forming apparatus 100 can be operated from the apparatus front side, the operability of the image forming apparatus 100 is good even in a case where the space above the image forming apparatus 100 is narrow or in a case where the left and right spaces of the image forming apparatus 100 are narrow.

Specifically, the feeding direction of the sheet from the cassette 203 in the apparatus main body 200 is from the apparatus front side to the apparatus rear side, and the discharging direction of the sheet is from the apparatus rear side to the apparatus front side. Further, the feeding direction of the document from the document feed tray 320 in the image reading apparatus 300 is from the apparatus front side to the apparatus rear side, and the discharging direction of the document is from the apparatus rear side to the apparatus front side. As described above, since the sheets and the documents of the apparatus main body 200 and the image reading apparatus 300 can be fed and discharged on the apparatus front side, the sheets and the documents can be easily fed and discharged even when the space in the horizontal direction of the image forming apparatus 100 is narrow.

In addition, since the cassette 203 is drawn out on the apparatus front side, the operation from the apparatus front side is also easy. Further, since the sub-tray 322 of the image reading apparatus 300 is also configured to be slidable toward the apparatus front side, the operation from the apparatus front side is easy. In addition, since the hinge 304 for pivoting the pressure plate 303 is arranged on the apparatus rear side and the gripping portion 323 for pivoting the pressure plate 303 is arranged on the apparatus front side, the operation from the apparatus front side is also easy. Furthermore, since the first abutment portion 305 and the inclined surface 308 are on the apparatus front side, the operation from the apparatus front side is also easy.

In addition, in the present embodiment, the gripping portion 323 for drawing out the sub-tray 322 is also used as a portion for gripping to open and close the pressure plate 303, and sub-tray 322 is locked by the locking portion 348 in a state where the sub-tray 322 is stored at the first position. Therefore, it is possible to suppress the sub-tray 322 from being unintentionally drawn out when the pressure plate 303 is opened and closed, and it is possible to improve the operability of the image forming apparatus 100 also in this respect.

In the present embodiment, by moving the reading unit 301 in the front-rear direction, the feeding direction and the discharging direction of the document by the ADF 310 can be set to the front-rear direction as described above. That is, in the case of the configuration in which the reading unit 301 is moved in the left-right direction, the main scanning direction of the reading unit 301 is the front-rear direction, and the sub-scanning direction is the left-right direction. Therefore, when the feeding-reading mode is performed using the ADF 310 with such a configuration, it is necessary to convey the document in the left-right direction. On the other hand, in the present embodiment, since the reading unit 301 is moved in the front-rear direction, the conveying direction of the document by the ADF 310 can be set to the front-rear direction as described above, and the operability from the apparatus front side can be improved.

In the present embodiment, since the sub-tray 322 is slid to the first position and the second position, the sub-tray 322 can be moved to the first position and the second position even if there is no space above the image forming apparatus 100. For example, in a case of a configuration in which the sub-tray is pivoted to be movable to a position where the sub-tray is stored in the casing of the image reading apparatus and a position where the sub-tray can support the document together with the main body tray, a space for pivoting the sub-tray is required above the image forming apparatus. On the other hand, in the present embodiment, since the sub-tray 322 is slid and moved, the sub-tray can be moved to the first position and the second position even if there is no space above, and operability is good even if the image forming apparatus 100 is installed in a narrow space.

Further, the first position is a position where the sub-tray 322 covers the upper side of the main body tray 321 in a state where the second supporting surface 322a is positioned above the back surface 322b which is the back surface of the second supporting surface 322a. Therefore, in a state where the sub-tray 322 is at the first position, for example, an upper surface of the sub-tray 322 can be used as a space for placing a document or the like.

Second Embodiment

Figure 27:
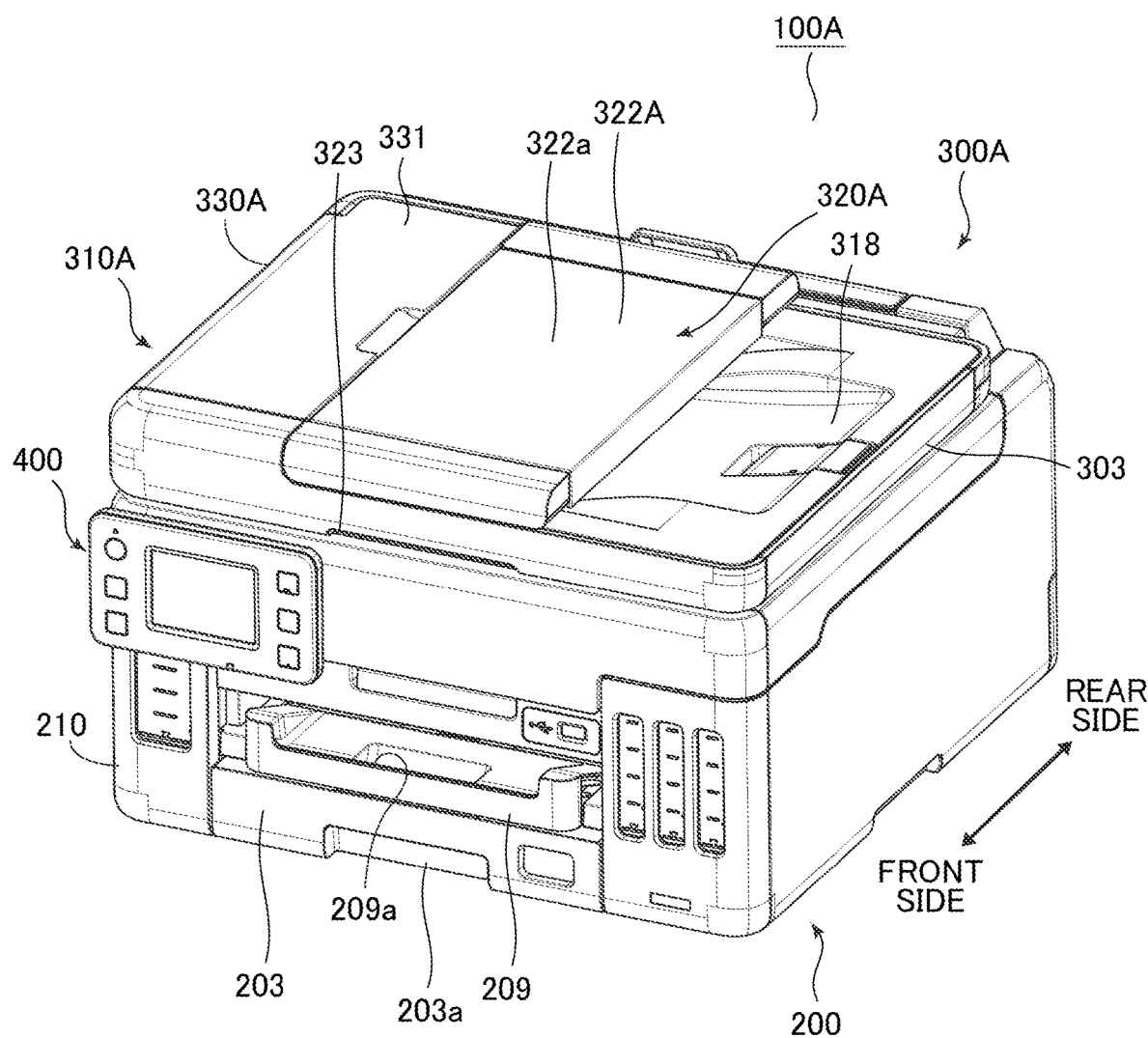
FIG. 27 is a perspective view of an image forming apparatus according to a second embodiment.
Figure 28:
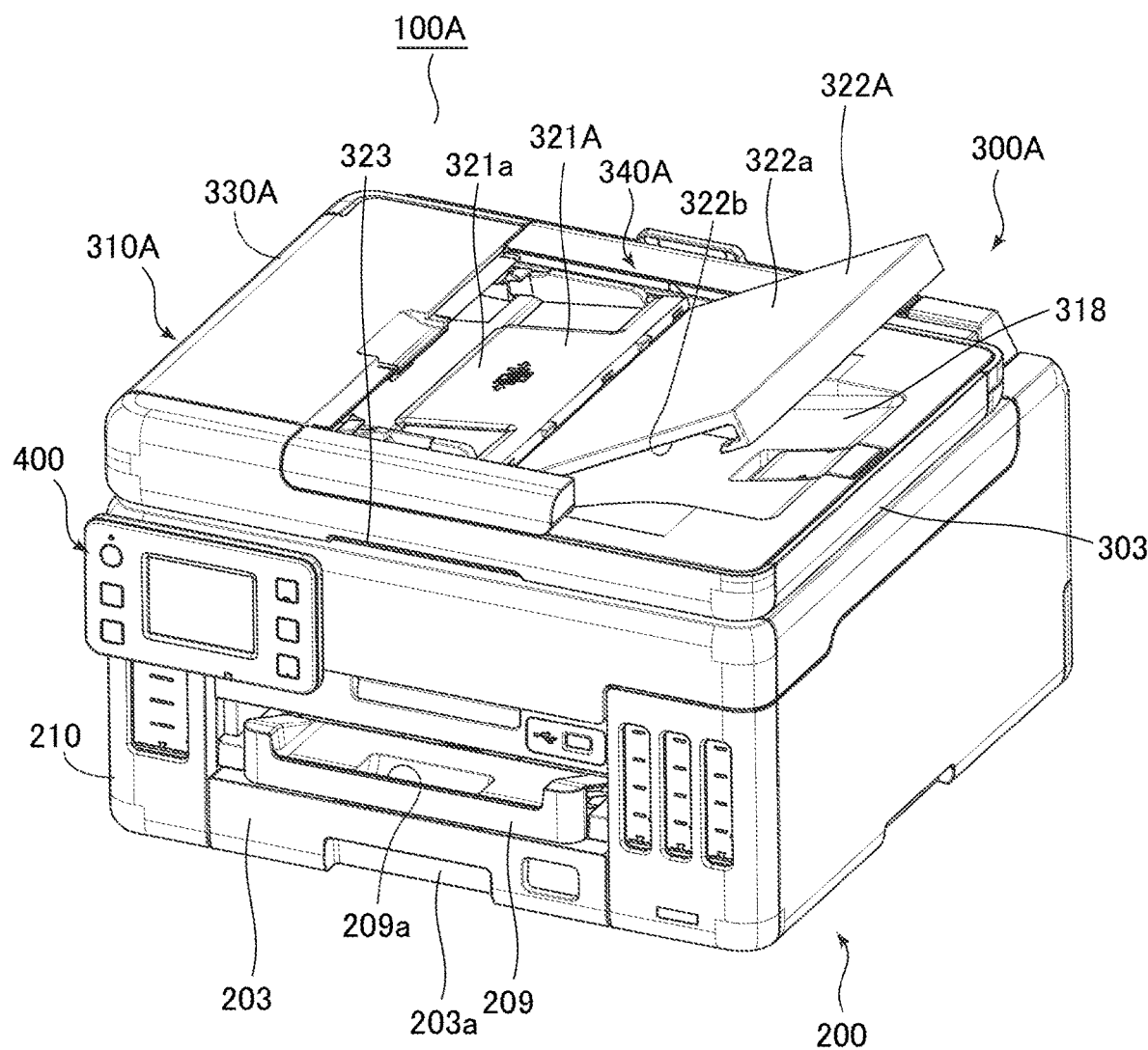
FIG. 28 is a perspective view illustrating a state in which a sub-tray of the image forming apparatus according to the second embodiment is drawn out.
Figure 29:
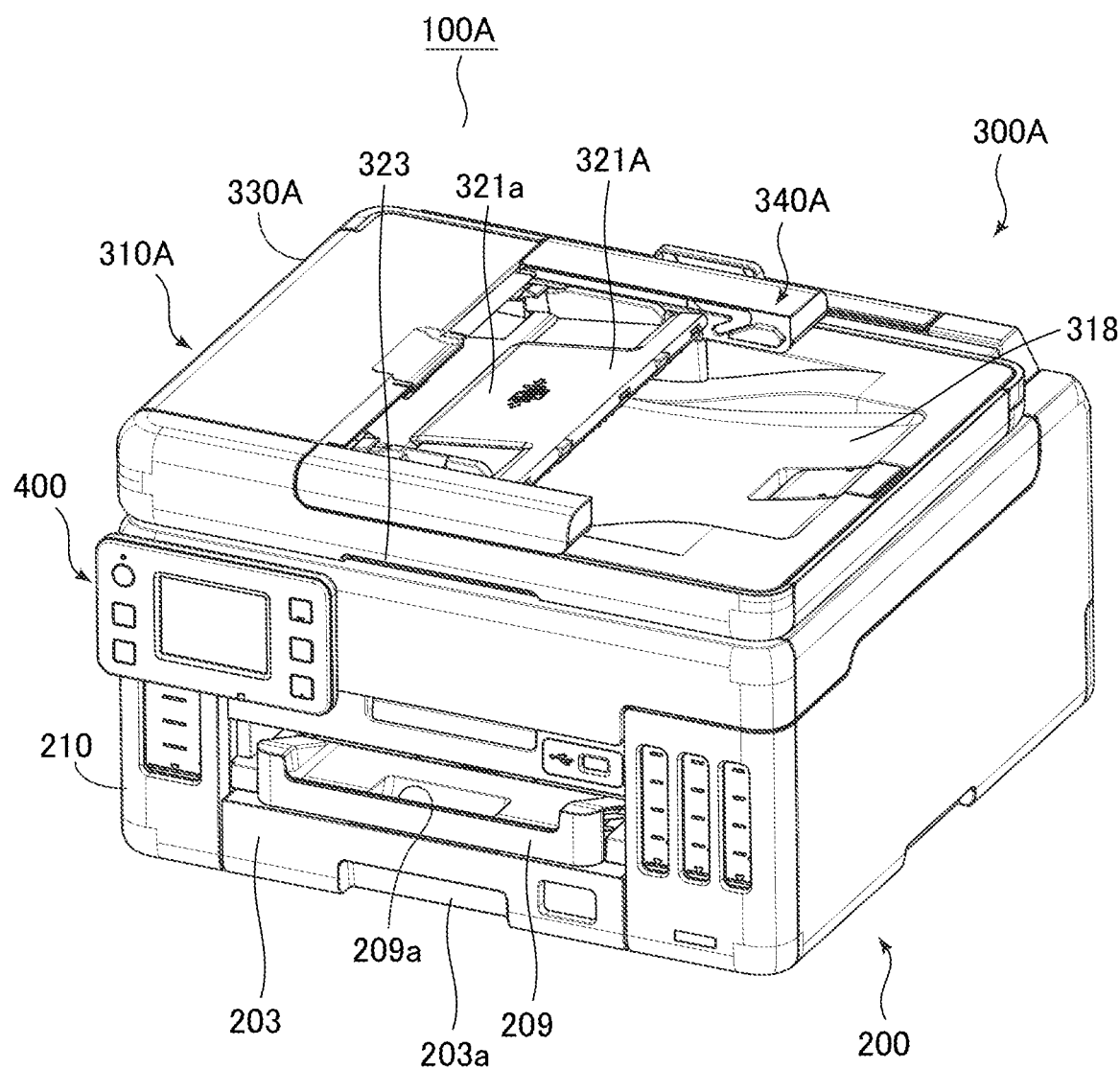
FIG. 29 is a perspective view illustrating a state in which a sub-tray of the image forming apparatus according to the second embodiment is removed.

A second embodiment will be described with reference to FIGS. 27 to 29. In the first embodiment described above, the document feeding direction and the document discharge direction of the ADF 310 are set to the front-rear direction. On the other hand, in the present embodiment, the document feeding direction and the document discharge direction of an ADF 310A as the automatic document feeding apparatus are set to the left-right direction. Accordingly, the moving direction of the reading unit 301 (see FIG. 6) is also set to the left-right direction. Since other configurations and operations are similar to those of the first embodiment described above, the same configurations are denoted by the same reference numerals, description and illustration thereof are omitted or simplified, and hereinafter, differences from the first embodiment will be mainly described.

First, an image forming apparatus 100A of the present embodiment includes an apparatus main body 200 similar to that of the first embodiment, and an image reading apparatus 300A is provided above the apparatus main body 200. Since the apparatus main body 200 is similar to that of the first embodiment, the feeding direction of the sheet from the cassette 203 is a direction from the apparatus front side (first side) to the apparatus rear side (second side), and the direction in which the sheet is discharged is a direction from the apparatus rear side to the apparatus front side.

On the other hand, the feeding direction of the document from the document feed tray 320A of the ADF 310A of the image reading apparatus 300A is a direction from the right side (third side, one side) to the left side (fourth side, the other side) in the width direction, and the document discharge direction is a direction from the left side to the right side in the width direction. Note that the document feeding direction may be a direction from the left side to the right side, and the document discharge direction may be a direction from the right side to the left side.

Similarly to the first embodiment, the pressure plate 303 including the ADF 310A has a hinge 304 (see FIG. 3) on the apparatus rear side, and is opened by being pivoted upward from the apparatus front side. The document conveying configuration and the image reading configuration of the ADF 310A are similar to those of the first embodiment except that the document conveying direction is different. The moving direction of the reading unit 301 is the left-right direction in accordance with the document conveying direction of the ADF 310A.

In addition, in the case of the present embodiment, similarly to the document feed tray 320 of the first embodiment, the document feed tray 320A that supports the document includes a main tray 321A serving as a first supporting portion having a first supporting surface 321a that supports the document, and a sub-tray 322A, serving as a second supporting portion and a slide supporting portion, having a second supporting surface 322a that supports the document together with the first supporting surface 321a. The sub-tray 322A is arranged so as to be slidable with respect to the pressure plate 303 between a first position and a second position located further on one side (right side in the present embodiment) than the first position in the width direction and forms a supporting surface capable of supporting the document at the second position.

The first position is a position where the sub-tray 322A covers the upper side of the main tray 321A in a state where the second supporting surface 322a is positioned above the back surface 322b which is the back surface of the second supporting surface 322a. That is, the first position is a storage position at which the sub-tray 322A is stored in the casing 330A of the image reading apparatus 300A, and is a position illustrated in FIG. 27.

Similarly to the first embodiment, in the sub-tray 322A, the second supporting surface 322a faces upward even in the state of being at the first position, and for example, the sub-tray does not pivot at the time of storage and the back surface does not face upward. The second supporting surface 322a of the sub-tray 322A constitutes an exterior surface of the image reading apparatus 300A in a state of being located at the first position. That is, the second supporting surface 322a also serves as an exterior cover of the image reading apparatus 300A.

The second position is a position where the second supporting surface 322a supports the document together with the first supporting surface 321a in a state where the second supporting surface 322a is positioned above the back surface 322b. That is, the second position is a position illustrated in FIG. 28, and is a document setting position where a document is set. In the sub-tray 322A, the inclination angle of the second supporting surface 322a with respect to the horizontal plane is larger than that of the first supporting surface 321a in the state of being at the second position.

In the present embodiment, the sub-tray 322A is positioned at the second position by drawing out the sub-tray 322A to one side (the right side in the present embodiment) in the width direction from the first position. That is, the direction in which the sub-tray 322A is slid from the first position to the second position is a direction from the other side to one side in the width direction. When the sub-tray 322A is returned from the second position to the first position, the sub-tray 322 is pushed to the other side (the left side in the present embodiment) in the width direction while returning the inclination of the sub-tray to the state of being at the first position, thereby positioning the sub-tray 322A at the first position. As illustrated in FIGS. 28 and 29, The sub-tray 322A is supported so as to be slidable between the first position and the second position by the slide movement supporting portion 340A. Since the configuration of the slide movement supporting portion 340A is similar to that of the first embodiment except for the slide direction, the description thereof will be omitted.

In addition, in the present embodiment as described above, since the sub-tray 322A is slid between the first position and the second position, the sub-tray can be moved between the first position and the second position even if there is no space above, and operability is good even if the image forming apparatus 100 is installed in a narrow space, as in the first embodiment. Further, the first position is a position where the sub-tray 322A covers the upper side of the main tray 321A in a state where the second supporting surface 322a is positioned above the back surface 322b which is the back surface of the second supporting surface 322a. Therefore, in a state where the sub-tray 322A is at the first position, for example, an upper surface of the sub-tray 322A can be used as a space for placing documents and the like.

OTHER EMBODIMENTS

The image forming apparatus of the present invention may be a copier, a facsimile machine, a multifunction peripheral, or the like, in addition to a printer. The multifunction peripheral has a plurality of functions, such as a copying machine, a printer, a facsimile.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-079422, filed May 13, 2022, which is hereby incorporated by reference herein in its entirety.

What is claimed is:

1. A document feeding apparatus comprising:
    a document supporting tray including a first supporting tray configured to support a document, and a second supporting tray configured to support the document together with the first supporting tray and provided so as to be movable between a first position at which the second supporting tray is located above the first supporting tray and a second position at which the second supporting tray supports the document together with the first supporting tray; and
    a document feeding roller configured to feed the document supported by the document supporting tray in a feeding direction,
    wherein when the second supporting tray moves from the first position to the second position, the second supporting tray is configured to slide from the first position to an upstream side in the feeding direction, pivot to be more inclined with respect to a horizontal direction than when it is at the first position, and then move obliquely downward.

2. The document feeding apparatus according to claim 1, further comprising:
    a document discharge portion configured to discharge the document fed by the document feeding roller; and
    a document stacking portion that is provided below the document supporting tray and on which the document discharged from the document discharge portion is stacked,
    wherein the document stacking portion includes an extension stacking portion configured to be drawn out from a casing of the document feeding apparatus in a direction in which the second supporting tray moves from the first position to the second position.

3. The document feeding apparatus according to claim 1, further comprising
    a slide movement supporting portion slidably supporting the second supporting tray, the slide movement supporting portion including a first engagement portion provided at both ends of the second supporting tray with respect to a width direction orthogonal to a direction in which the document feeding roller feeds the document, and a second engagement portion provided in a casing of the document feeding apparatus and engageable with the first engagement portion.

4. The document feeding apparatus according to claim 3, wherein
    the first engagement portion is a projection protruding toward the second engagement portion, and
    the second engagement portion is a recess that is engaged with the projection to slidably guide the second supporting tray.

5. The document feeding apparatus according to claim 4, wherein
    the second supporting tray is inclined at the second position in such a manner that the second supporting tray is positioned upward as it goes to the upstream side in the feeding direction in a state where the second supporting tray is positioned, and
    the slide movement supporting portion includes a holding portion configured to hold the second supporting tray in an inclined state at the second position.

6. The document feeding apparatus according to claim 1, further comprising
    an urging portion configured to apply an urging force to the second supporting tray in a direction opposite to a moving direction in a case where the second supporting tray moves from the first position to the second position.

7. The document feeding apparatus according to claim 6, wherein the urging portion includes:
    an abutting portion provided on one of a casing of the document feeding apparatus and the second supporting tray; and
    an abutted portion provided on the other of the casing of the document feeding apparatus and the second supporting tray, abutting on the abutting portion in a state where the second supporting tray is located at a predetermined position between the first position and the second position, and not abutting on the abutting portion in a state where the second supporting tray is located closer to the second position than the predetermined position.

8. The document feeding apparatus according to claim 7, wherein the abutted portion does not abut on the abutting portion in a state where the second supporting tray is located at the first position.

9. The document feeding apparatus according to claim 1, further comprising
    an operation panel configured to receive an operation by an operator, wherein
    the document feeding roller feeds a document in a direction from an apparatus front side, which is a front side of the document feeding apparatus provided with the operation panel, toward an apparatus rear side, which is a rear side of the document feeding apparatus, and
    a direction in which the second supporting tray moves from the first position to the second position is a direction from the apparatus rear side toward the apparatus front side.

10. An image reading apparatus comprising:
    a document supporting tray including a first supporting tray configured to support a document, and a second supporting tray configured to support the document together with the first supporting tray and provided so as to be movable between a first position at which the second supporting tray is located above the first supporting portion-tray and a second position at which the second supporting tray supports the document together with the first supporting tray;

a document feeding roller configured to feed a document supported by the document supporting tray in a feeding direction; and an image reading sensor configured to read an image on a document fed by the document feeding roller, wherein when the second supporting tray moves from the first position to the second position, the second supporting tray is configured to slide from the first position to an upstream side in the feeding direction, pivot to be more inclined with respect to a horizontal direction than when it is at the first position, and then move obliquely downward.

11. An image forming apparatus comprising:

a document supporting tray including a first supporting tray configured to support a document, and a second supporting tray configured to support the document together with the first supporting tray and provided so as to be movable between a first position at which the second supporting tray located above the first supporting portion-tray and a second position at which the second supporting tray supports the document together with the first supporting tray;

a document feeding roller configured to feed a document supported by the document supporting tray in a feeding direction;

an image reading sensor configured to read an image on a document fed by the document feeding portion roller; and an image former configured to form an image on a sheet based on the image on the document read by the image reading sensor, wherein when the second supporting tray moves from the first position to the second position, the second supporting tray is configured to slide from the first position to an upstream side in the feeding direction, pivot to be more inclined with respect to a horizontal direction than when it is at the first position, and then move obliquely downward.

12. The image forming apparatus according to claim 11, further comprising a sheet discharge portion configured to discharge a sheet on which an image is formed by the image former in a sheet discharge direction from an apparatus rear side toward an apparatus front side, wherein a direction in which the second supporting tray moves from the first position to the second position is a direction from the apparatus rear side toward the apparatus front side.

13. The image forming apparatus according to claim 11, further comprising a sheet discharge portion configured to discharge a sheet on which an image is formed by the image former in a sheet discharge direction from an apparatus rear side toward an apparatus front side, wherein a direction in which the second supporting tray moves from the first position to the second position is a left-right direction orthogonal to a direction from the apparatus rear side toward the apparatus front side.

* * * * *